United States Patent [19]
Vitols et al.

[11] 4,081,607
[45] Mar. 28, 1978

[54] KEYWORD DETECTION IN CONTINUOUS SPEECH USING CONTINUOUS ASYNCHRONOUS CORRELATION

[75] Inventors: Visvaldis A. Vitols, Orange; James E. Paul, Jr., Anaheim, both of Calif.

[73] Assignee: Rockwell International Corporation, El Segundo, Calif.

[21] Appl. No.: 737,809

[22] Filed: Nov. 1, 1976

Related U.S. Application Data

[63] Continuation of Ser. No. 564,564, Apr. 2, 1975, abandoned.

[51] Int. Cl.$^2$ ............................................. G10L 1/00
[52] U.S. Cl. ................................................. 179/1 SB
[58] Field of Search .......................... 179/1 SA, 1 SD

[56] References Cited

U.S. PATENT DOCUMENTS

| | | | |
|---|---|---|---|
| 3,816,722 | 6/1974 | Sakoe | 179/1 SA |
| 3,883,850 | 5/1975 | Martin | 179/1 SA |

FOREIGN PATENT DOCUMENTS

| | | | |
|---|---|---|---|
| 1,303,417 | 1/1973 | United Kingdom | 179/1.5 A |
| 1,172,244 | 3/1967 | United Kingdom | 179/1 SD |

OTHER PUBLICATIONS

T. Martin, "Acoustic Recognition of a Limited Vocabulary in Continuous Speech," University Microfilms, 1970, pp. 96, 100, 103, 149 inter alia.

*Primary Examiner*—Kathleen H. Claffy
*Assistant Examiner*—E. S. Kemeny
*Attorney, Agent, or Firm*—H. Frederick Hamann; Rolf M. Pitts; George Jameson

[57] ABSTRACT

A system for detecting one or more keywords in continuous speech is disclosed wherein a speech processor extracts a plurality of analog speech parameters from the input continuous speech, an STV (Spectral Time Vector) generator circuit selectively converts the plurality of analog speech parameters into digitized spectral parameters, an asynchronous correlation circuit continuously correlates sequences of the digitized spectral parameters with stored reference mask templates representative of subelements (dyads or triads) of one or more desired keywords in order to produce continuous correlation data, and a decision function circuit is responsive to the correlation data for developing an occurrence decision output for each desired keyword that is detected.

35 Claims, 25 Drawing Figures

MASK STORAGE MEMORY ADDRESS LOCATIONS

STV ADDRESS LOCATIONS IN RAM 81
DURING VARIOUS LOAD AND RUN STATES

TYPES OF CORRELATION OPERATIONS

| ARITHMETIC PIPELINE UNIT 151 TYPES | DISCRIMINANT FUNCTION FOR ARITHMETIC PIPELINE UNIT 151 | COMPARISON FUNCTION 153 | THRESHOLD FUNCTION MODIFIER 157 | WEIGHTING FUNCTION MODIFIER 161 | SUM ACCUMULATOR 165 |
|---|---|---|---|---|---|
| #1 | $d = \sum_{i=1}^{n} w_i \lfloor |x_i - r_i|, \theta_i \rfloor$ (THRESHOLD DISTANCE FUNCTION) | $c_i = |x_i - r_i|$ (6-bit words) (FIG. 13A) | $t_i = f(c_i, \theta_i) = \begin{cases} 1 \text{ if } c_i > \theta_i \\ 0 \text{ otherwise} \end{cases}$ (FIG. 14A) | $m_i = w_i t_i$ (5-bit words) (FIG. 15A) | $d = \sum_{i=1}^{n} m_i$ (18-bit words) (FIG. 16) |
| #2 | $d = \sum_{i=1}^{n} |x_i - r_i|$ (UNWEIGHTED ABSOLUTE VALUE DISTANCE FUNCTION) | $c_i = |x_i - r_i|$ (6-bit words) (FIG. 13A) | $t_i = c_i$ (6-bit words) (FIG. 14C) | $m_i = t_i$ (6-bit words) (FIG. 15B) | $d = \sum_{i=1}^{n} m_i$ (18-bit words) (FIG. 16) |
| #3 | $d = \sum_{i=1}^{n} w_i |x_i - r_i|$ (WEIGHTED ABSOLUTE VALUE DISTANCE FUNCTION) | $c_i = |x_i - r_i|$ (6-bit words) (FIG. 13A) | $t_i = c_i$ (6-bit words) (FIG. 14C) | $m_i = w_i t_i$ (11-bit words) (FIG. 15A) | $d = \sum_{i=1}^{n} m_i$ (18-bit words) (FIG. 16) |
| #4 | $d = \sum_{i=1}^{n} (x_i - r_i)^2$ (EUCLIDEAN DISTANCE SQUARED FUNCTION) | $c_i = |x_i - r_i|$ (6-bit words) (FIG. 13A) | $t_i = c_i c_i$ (12-bit words) (FIG. 14B) | $m_i = t_i$ (12-bit words) (FIG. 15B) | $d = \sum_{i=1}^{n} m_i$ (18-bit words) (FIG. 16) |
| #5 | $d = \sum_{i=1}^{n} x_i r_i$ (DOT PRODUCT OF TWO VECTORS FUNCTION) | $c_i = x_i r_i$ (12-bit words) (FIG. 13B) | $t_i = c_i$ (12-bit words) (FIG. 14C) | $m_i = t_i$ (12-bit words) (FIG. 15B) | $d = \sum_{i=1}^{n} m_i$ (18-bit words) (FIG. 16) |

FIG. 12

TYPE #1 ARITHMETIC PIPELINE UNIT 151

OPERATION FOR A 16-WORD LENGTH MASK X

KEYWORD DETECTION IN CONTINUOUS SPEECH USING CONTINUOUS ASYNCHRONOUS CORRELATION

The invention herein described was made in the course of or under a Contract or Subcontract thereunder with the United States Army.

This is a continuation of application Ser. No. 564,564 filed Apr. 2, 1975, now abandoned.

BACKGROUND OF THE INVENTION

1. Field of the Invention

This invention relates to speech recognition systems and particularly to a system capable of recognizing keywords in continuous speech.

2. Description of the Prior Art

Many speech recognition systems have been proposed for application in such fields as data processing, communications and machine control in industry.

U.S. Pat. Nos. 3,775,627 and 3,582,559 describe discrete word recognition systems which can only operate upon isolated utterances and will not function to detect keywords in continuous speech.

A word recognition system based on a sequence of phonetic event detections is disclosed in U.S. Pat. No. 3,588,363. This system, while applicable to discrete utterances, will not function with continuous speech, since the sound recognition network must be reset at the beginning of each word.

A limited vocabulary (fixed to two words) word recognition system is described in each of U.S. Pat. Nos. 3,557,310 and 3,688,126. Neither of these systems will respond to a keyword in continuous speech.

A system for detecting formants (poles in the vocal tract transfer function) in speech is disclosed in U.S. Pat. No. 3,499,989. This system performs speech analysis but not utterance classification.

A system for classifying vowel sounds and making vowel/nonvowel decisions is described in U.S. Pat. No. 3,428,748. This system, like the system of U.S. Pat. No. 3,499,989, is a speech analyzer and is not capable of performing utterance classification.

U.S. Pat. Nos. 3,129,287 and 3,742,143 describe limited vocabulary isolated word recognition systems which are unable to accomplish keyword recognition.

The system disclosed in U.S. Pat. No. 3,198,884 is oriented toward discrete digit recognition. This system establishes acoustic time registration via a segmentation procedure. These segmentation procedures are subject to gross errors and are unsuitable for keyword recognition.

The system taught in U.S. Pat. No. 3,742,146 is directed to the classification of vowel sounds and has no provision for combining these events for keyword detection.

In the article of G. L. Clapper, entitled "Automatic Word Recognition", found on pages 57-69 of IEEE Spectrum, August 1971, a system is described for recognizing discrete words. Since the system described in this article relies on word boundary information, keyword recognition by this system is impossible.

Asynchronous detection of keywords in continuous speech implies that no synchronization points are employed in the recognition process. Asynchronous detection is especially desirable in the classification of continuous speech for two reasons. First, the duration of a keyword in continuous speech is determined by the rate of speech and the stress given to the keyword as part of the spoken message. Second, the position of the same phonetic elements across an ensemble of different utterances of the same keyword may not be linearly related. This second reason reduces the applicability of linear time normalization which has been found useful in discrete word recognition.

Many of these prior art speech recognition systems, as well as other like systems, employ synchronization points in the recognition process. Conventional prior art procedures derive synchronization points with pre-classification segmentation procedures. Segmentation procedures possess two inherent disadvantages. First, performance degrades rapidly when noise is applied to the signal. Second, computational requirements are often severe. Basing a keyword spotting or detection system on a synchronous process which is inherently noisy is not an optimal procedure, since an omitted segmentation boundary could inhibit keyword recognition even with perfect recognition logic.

None of the above-described systems is capable of operating on continuous speech to detect one or more keywords.

SUMMARY OF THE INVENTION

Briefly, a novel asynchronous detection system is provided for detecting an unlimited number of keywords in continuous speech, which system does not require word isolation or segmentation. In a preferred embodiment, a plurality of analog speech parameters are extracted by a speech processor from input continuous speech and selectively converted into digitized speech or spectral parameters by an STV (Spectral Time Vector) generator circuit. Sequences of the digitized speech or spectral parameters are continuously correlated in an asynchronous correlation circuit with stored spectral reference mask templates corresponding to preselected keywords to be recognized in order to produce correlation data. This correlation data enables a decision function circuit to develop a decision output for each preselected keyword that is detected.

It is therefore an object of this invention to provide a novel asynchronous speech recognition system.

Another object of this invention is to provide a system capable of recognizing keywords in continuous speech.

A further object of this invention is to provide a system for detecting keywords in continuous speech by utilizing a continuous asynchronous correlation operation.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 12 illustrates different types of correlation operations performed by some of the different configurations that could be utilized in the arithmetic pipeline unit of FIG. 5;

DESCRIPTION OF THE PREFERRED EMBODIMENT

Figure 1:
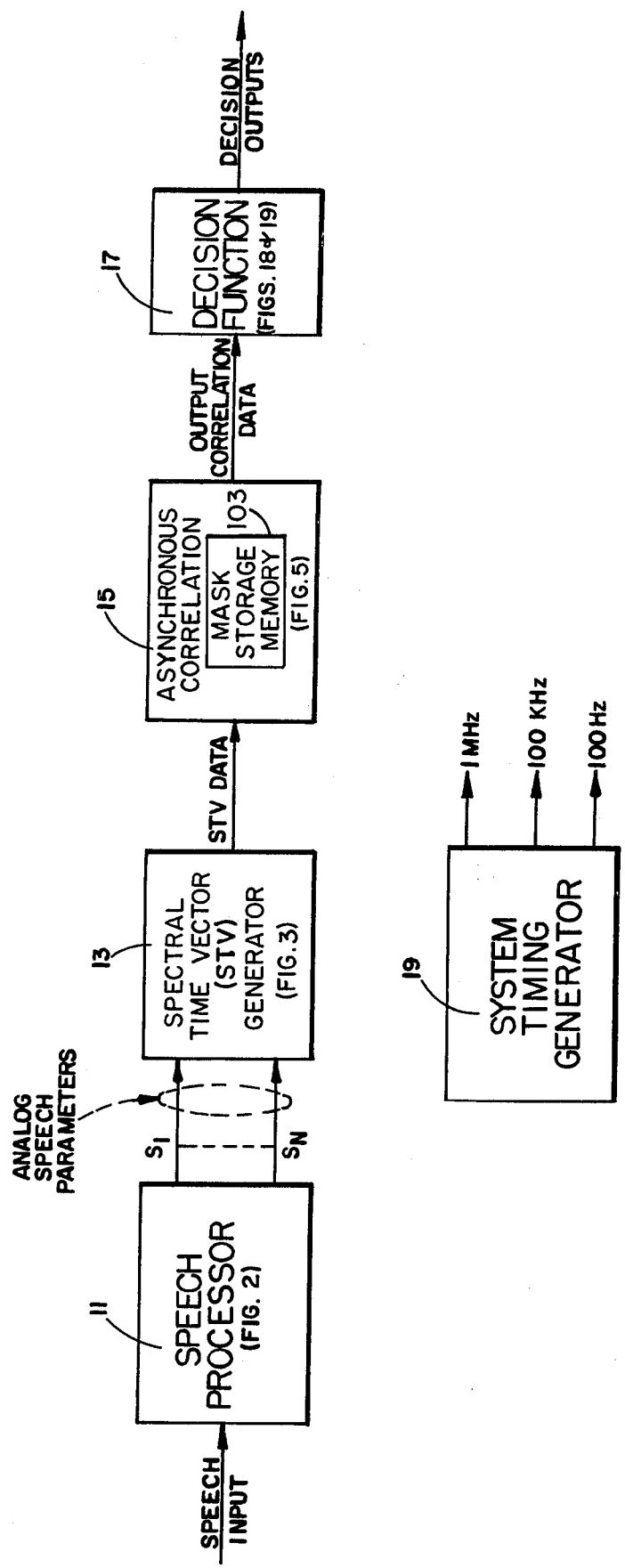
FIG. 1 is a simplified block diagram of a manner, embodiment of the invention.

Referring now to the drawings, FIG. 1 discloses a simplified block diagram of a preferred embodiment of the invention for detecting one or more keywords in an input continuous speech. A speech processor 11, which is essentially a spectral analyzer, makes N analog spectral estimates of a continuous broadband speech input signal to develop analog speech parameters $S_1 - S_N$ in N channels. These spectral estimates can relate to the energy in 200 Hertz (Hz) wide contiguous bandpasses. Each of the N channels of analog speech parameters are time division multiplexed and digitized by an STV generator 13 to N digitized spectral parameters, or develop N-component spectral time vector (STV) data, every 10 millisecond (msec.) period. The STV data, or digitized spectral parameters, at the output of the STV generator 13 can also be called digitized speech parameters or digitized spectral estimates.

This STV data from the STV generator 13 is stored in an asynchronous correlation circuit 15, along with a preselected number of previously received STVs to form a sequence of STVs being stored. Each time that a new STV is received, the oldest stored STV is discarded from the sequence. The sequence of stored STVs essentially forms a spectrogram with the frequency components of each STV being disposed along, for example, a vertical frequency axis and the STVs being disposed along a horizontal time axis in 10 msec increments. With an STV being taken every 10 msec, a pattern develops which forms the spectrogram.

The asynchronous correlation circuit 15 continuously performs an asynchronous correlation on the sequence of STVs being generated by the STV generator 13. To accomplish this continuous asynchronous correlation, the incoming digital speech parameters in a sequence of consecutive STVs are selectively matched or correlated in the correlation circuit 15 with internally stored reference mask templates or masks (indicated in FIG. 9). The stored masks are representative of subelements of the keyword utterance. Typically, these subelements are phoneme pairs ("dyads" or two phonetic events) and/or phoneme triplets ("triads" or three phonetic events). One dyad or triad would be stored in each mask. On the average, six masks would be required for the detection of a desired keyword by the system.

It should be noted that our English language has a phonetic alphabet which is made up of phonetic symbols which, in turn, represent these phonetic events. There are about 44 phonetic events in the English language. These phonetic events include, for example, vowel sounds (ee, uh, uu, er, ah, etc.), "stops" which a person forms by closing his vocal tract in certain positions (*t, k, g, b,* etc.) and other consonant sounds.

The stored masks can be of different lengths. Typically, they can vary from 1 to 16 STVs in length, with an average mask being about 10 STVs in length.

Each of the stored masks is periodically compared with a correspondingly long sequence of consecutive STVs to identify or correlate the dyad and triad sound groups. The closeness of the identification or correlation between each mask and the corresponding STV sequence is indicated by a correlation score. In this manner, a measurement of keyword likelihood for each of the desired keywords is periodically computed.

The output correlation scores between the stored masks and the parameterized speech or STVs are incorporated into output correlation data from the correlation circuit 15. This output correlation data is combined into an overall similarity metric by a decision function circuit 17, which may be a computer or special purpose logic. This similarity metric is internally thresholded in the decision function 17 to produce an occurrence decision output for each keyword that is detected. The decision function's combination of the correlation data takes into account the temporal sequence of the subelements of the keyword as well as the variability in articulation rate.

A system timing generator 19 supplies, via internal countdown circuits (not shown), output clock pulse timing signals of 1 MHz, 100 KHz and 100 Hz, which are selectively supplied to the circuits of FIG. 1 to enable them to perform their above-indicated operations. The circuit components of FIG. 1 will now be discussed in more detail to more clearly explain the invention.

Figure 2:
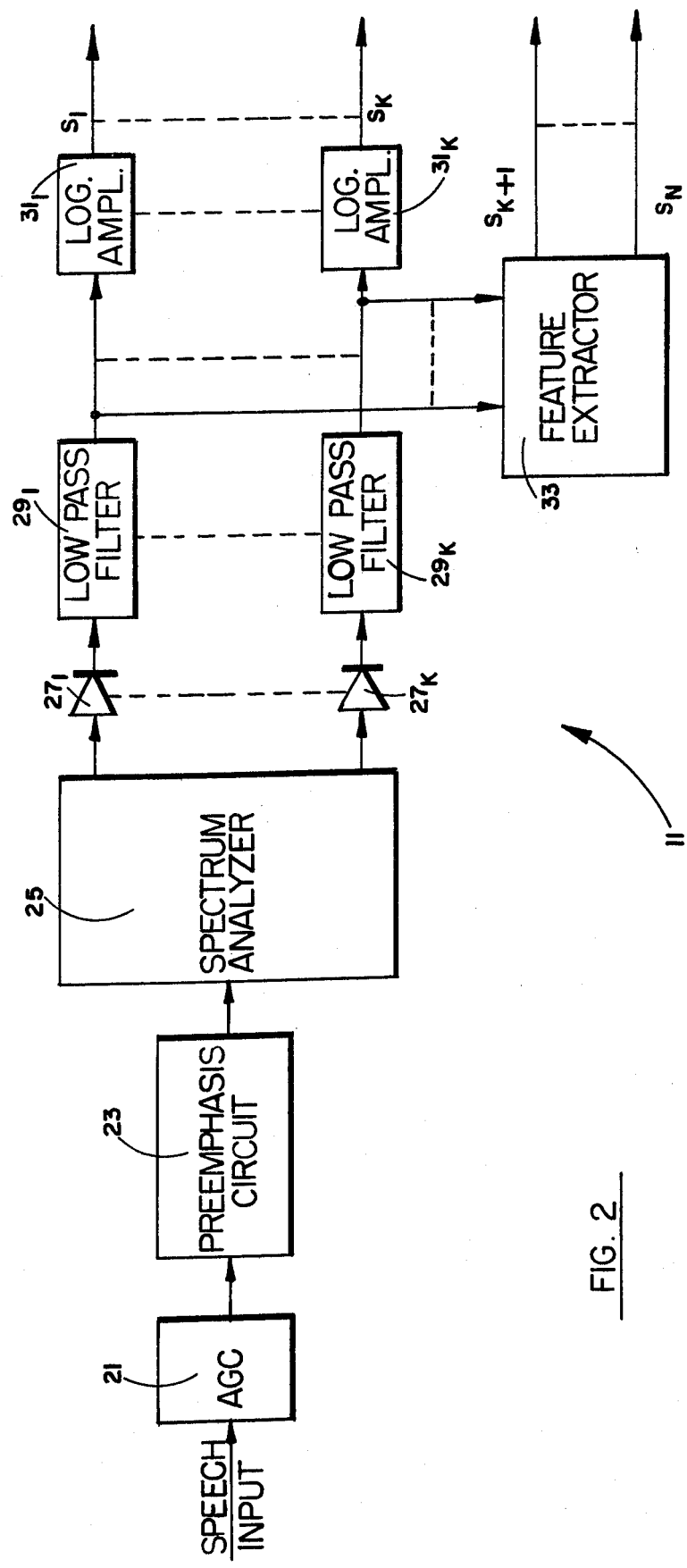
FIG. 2 is a block diagram of the speech processor of FIG. 1.

Referring now to FIG. 2, a block diagram of the speech processor 11 of FIG. 1 is illustrated. The continuous speech input signal is gain-controlled by an automatic gain control (AGC) circuit 21 before being applied to a preemphasis circuit 23. The preemphasis circuit 23 emphasizes the frequency spectrum of the signal from the AGC circuit 21 by, for example, 6 decibels per octave before applying the resultant preemphasized signal to a spectrum analyzer 25. The spectrum analyzer 25 may comprise a filter bank of contiguous 200 Hz bandpass filters (not shown) for separating the various frequency components in the preemphasized signal.

The various separated frequency components from the spectrum analyzer 25 are respectively detected through rectification by diodes $27_1 - 27_K$ and filtering by low pass filters $29_1 - 29_K$ before being applied to conventional logarithmic amplifiers $31_1 - 31_K$ to develop the analog speech parameters $S_1 - S_K$. The outputs of preselected ones of the filters $29_1 - 29_K$ may also be applied to a feature extractor 33 for the generation of linear and non-linear functions of these preselected filter outputs to develop the analog speech parameters $S_{K+1} - S_n$. Any selected number and combination of the analog speech parameters from the logarithmic amplifiers $31_1 - 31_K$ and the feature extractor 33 may be utilized in subsequent signal processing. In any event, for purposes of the following description, assume that the total number of analog speech parameters to be processed is N and that N = 16. The spectral estimates or analog speech parameters $S_1 - S_{16}$ (where N = 16) from the speech processor 11 are applied to the STV generator 13 to develop an associated STV.

Figure 3:
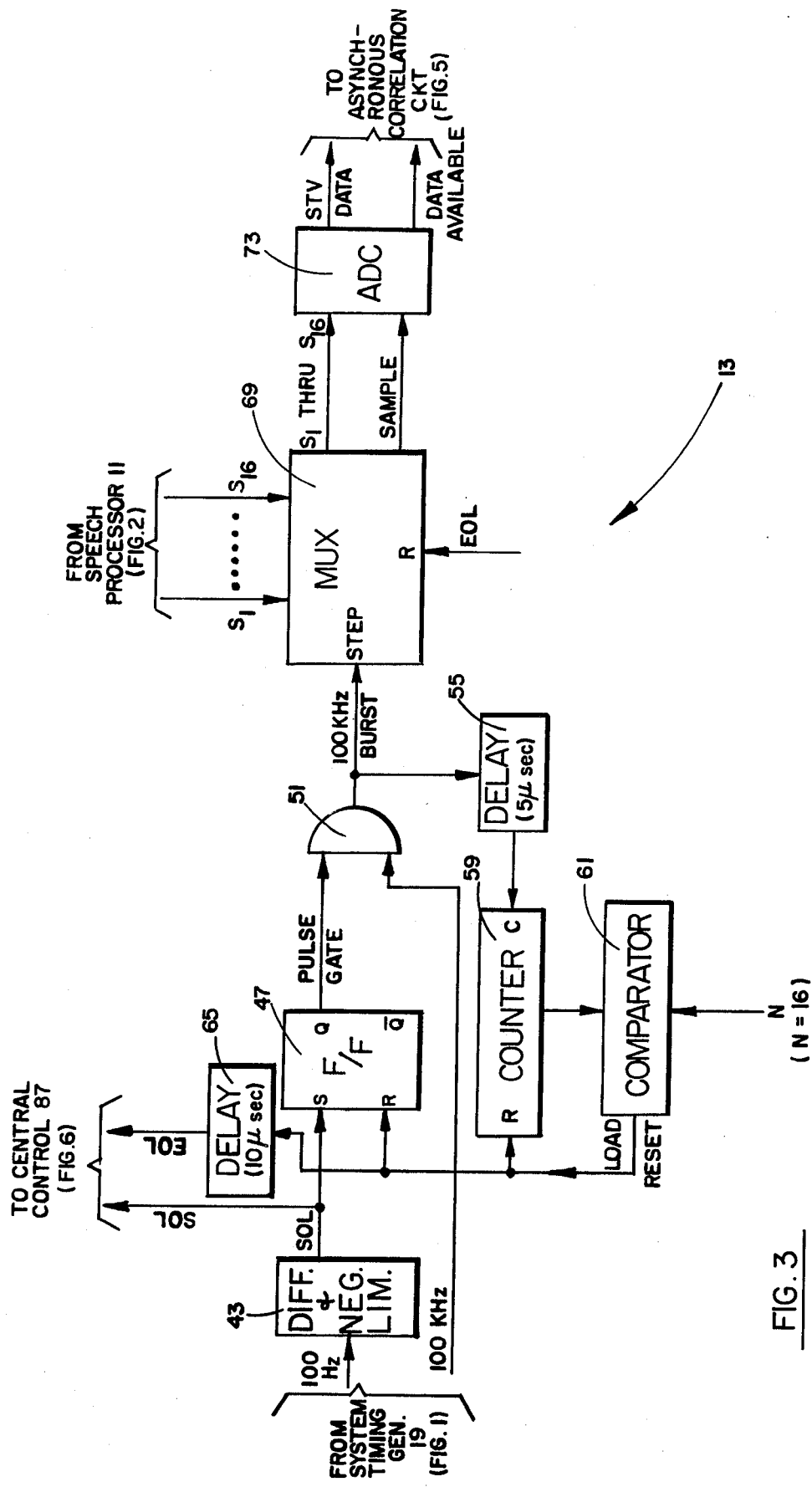
FIG. 3 is a block diagram of the STV generator of FIG. 1.
Figure 4:
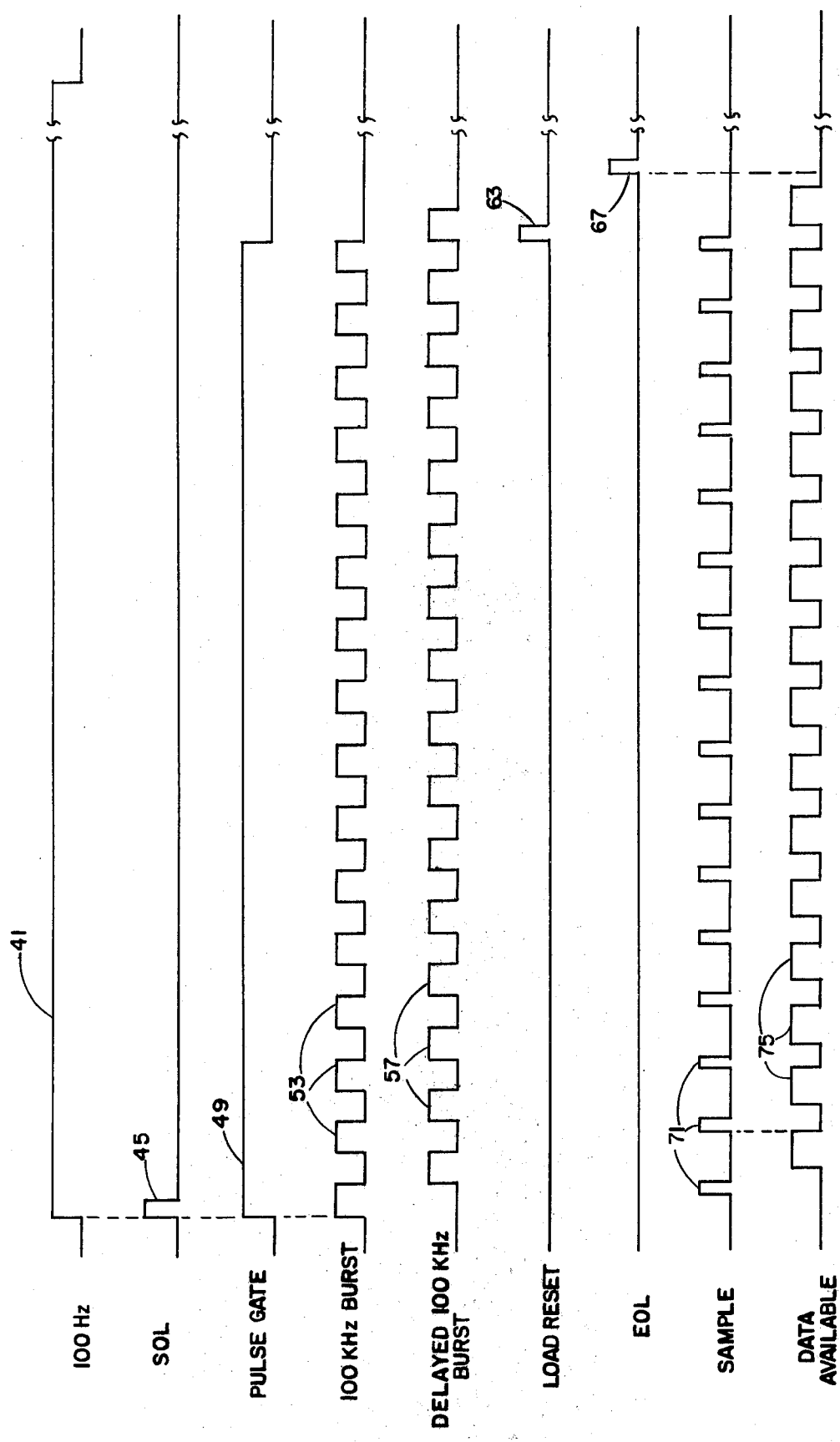
FIG. 4 illustrates waveforms useful in explaining the operation of the STV generator circuit of FIG. 3.

Referring now to FIG. 3, a block diagram of the STV generator 13 is illustrated. The waveforms of FIG. 4 will also be referred to in explaining the operation of the circuit 13 of FIG. 3. The 100 Hz signal (waveform 41) from the system timing generator 19 to differentiated and negative limited by a differentiator and negative limiter 43 to develop a start of load pulse (SOL) illustrated in waveform 45. The SOL pulse sets flip flop 47 to initiate the pulse gate 49. Pulse gate 49 enables an AND gate 51 to pass a preselected number of 100 KHz pulses from the system timing generator 19 as a 100 KHz burst of 16 pulses illustrated by the waveform 53. This 100 KHz burst of pulses is delayed 5 microseconds ($\mu$sec) by a delay circuit 55 before being applied as a delayed 100 KHz burst of 16 pulses (waveform 57) to the count (C) input of counter 59 to initiate its counting sequence. The output count of the counter 59 is applied to a comparator 61 where it is compared with an N count of 16. When the count of the counter 61 reaches 16, the comparator generates a load reset pulse 63 which is used to reset the counter 59 to a zero count and to reset the flip flop 47 to prevent any subsequent pulses from being passed through the AND gate 51 and being counted by the counter 59. The load reset pulse 63 is delayed 10 microseconds by a delay circuit 65 in order to generate an end of load pulse (EOL) 67. The SOL and EOL pulses are applied to a central control circuit 87 in FIG. 5, the operation of which will be subsequently explained.

The 100 KHz burst of pulses 53 from the AND gate 51 is applied to the step input of an N or 16-channel multiplexer 69. The multiplexer 69 steps up one position for each of the 16 pulses in the 100 KHz burst of pulses. The analog speech parameters $S_1 - S_{16}$ from the speech processor 11 (FIG. 2) are applied in parallel to the multiplexer 69. With each one of the sixteen 100 KHz burst of pulses being applied to its step input, the multiplexer 69 time division multiplexes the analog speech parameters $S_1 - S_{16}$ so that they are sequentially applied to an analog to digital converter (ADC) 73. The multiplexer 60 also generates sample pulses 71 which are applied to the ADC 73 to enable the ADC 73 to sequentially digitize the sequentially aligned spectral estimates or analog speech parameters $S_1$ through $S_{16}$. The 16 sequentially developed digitized spectral estimates or parameters comprise one spectral time vector (STV). A new STV or STV data is developed every 10 msec. This 10 msec period is the interpulse period for the 100 Hz pulse from the system timing generator 19. After a new STV is developed by the ADC 73, the multiplexer 69 is reset to its initial step position by the EOL pulse in preparation for the start of the next LOAD state.

Each one of the digitized $S_1 - S_{16}$ spectral estimates is a binary word which may be, for example, 6 bits wide. It should be noted at this time that henceforth the term "word" will be used to define a binary word, while the term "keyword" will be used to define a dictionary word that is being sought for detection in the speech input.

The spectral estimates or analog speech parameters $S_1$ through $S_{16}$ are sequentially aligned because it takes approximately 10 $\mu$sec. for the ADC 73 to perform an analog to digital conversion per sample. Therefore it takes approximately 160 $\mu$sec. for all 16 channels of serialized speech parameters $S_1$ through $S_{16}$ to be digitized. As stated before, the 16 sequentially developed digitized spectral estimates or parameters $S_1 - S_{16}$ comprise one spectral time vector (STV). Hence, in this description each STV is comprised of a serial sequence of 16 binary words, with each word being 6 bits wide. After each one of the analog speech parameters or spectral estimates $S_1 - S_{16}$ is digitized, the ADC 73 generates a data available signal 75 to indicate that the STV data is ready to be utilized.

Figure 5:
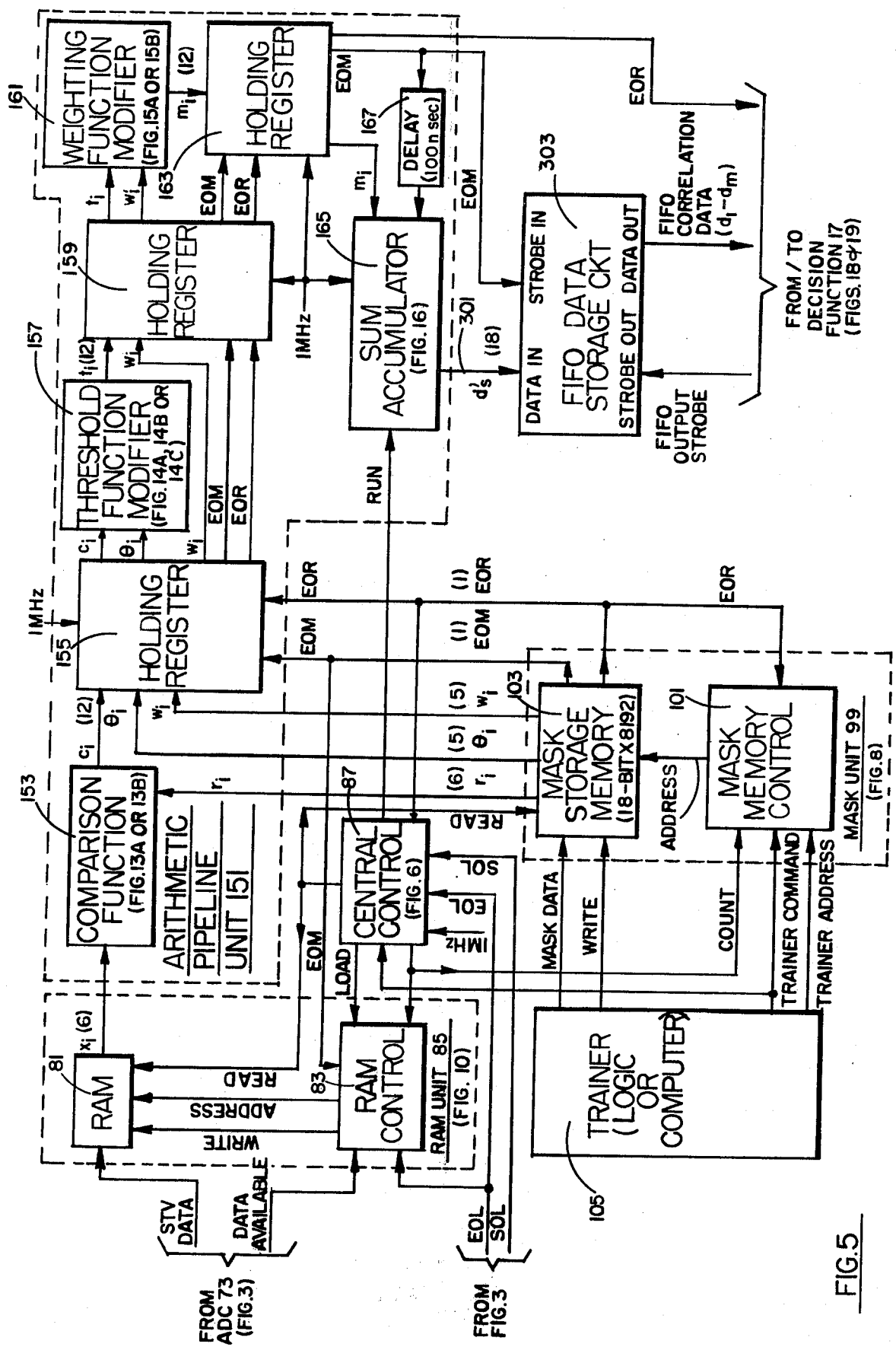
FIG. 5 is a block diagram of the asynchronous correlation circuit of FIG. 1.

Referring now to FIG. 5, the STV data and data available signals from FIG. 3 are respectively applied to a random access memory (RAM) 81 and a RAM control 83 in RAM unit 85 (to be discussed later), while the SOL and EOL pulses from the STV generator 13 of FIG. 3 are applied to the central control 87. The central control 87 generates load and run gates which respectively control the duration of LOAD and RUN states of operation. At this time, the block diagram of the central control 87 in FIG. 6 and the waveforms of FIG. 7 will be referred to to more clearly explain the operation of the central control.

Figure 6:
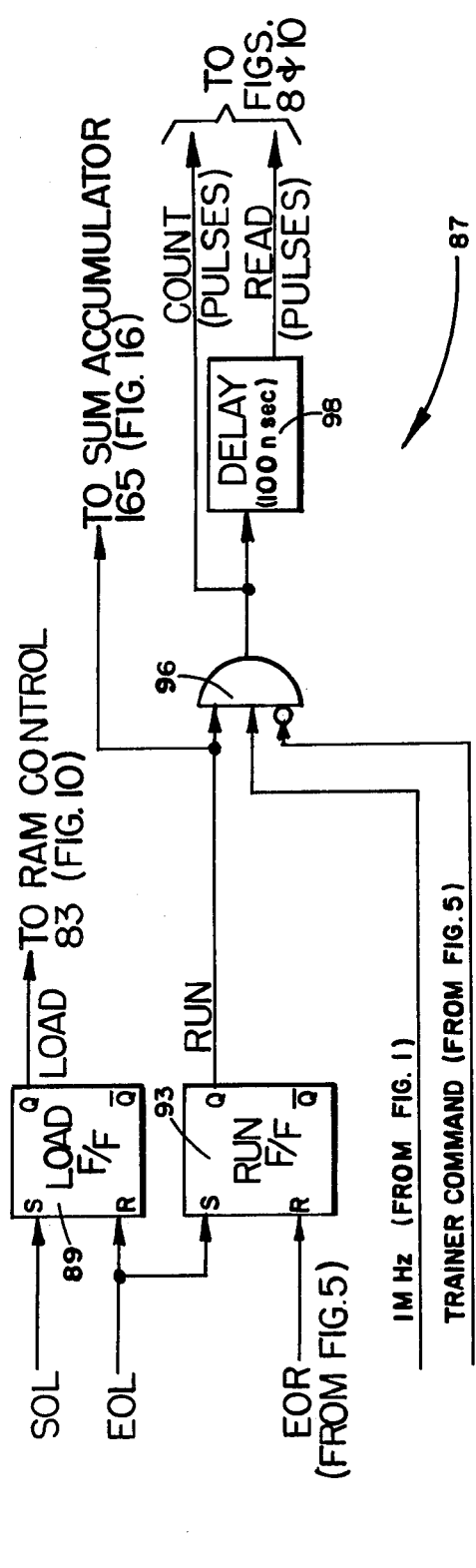
FIG. 6 is a block diagram of the central control of FIG. 5.
Figure 7:
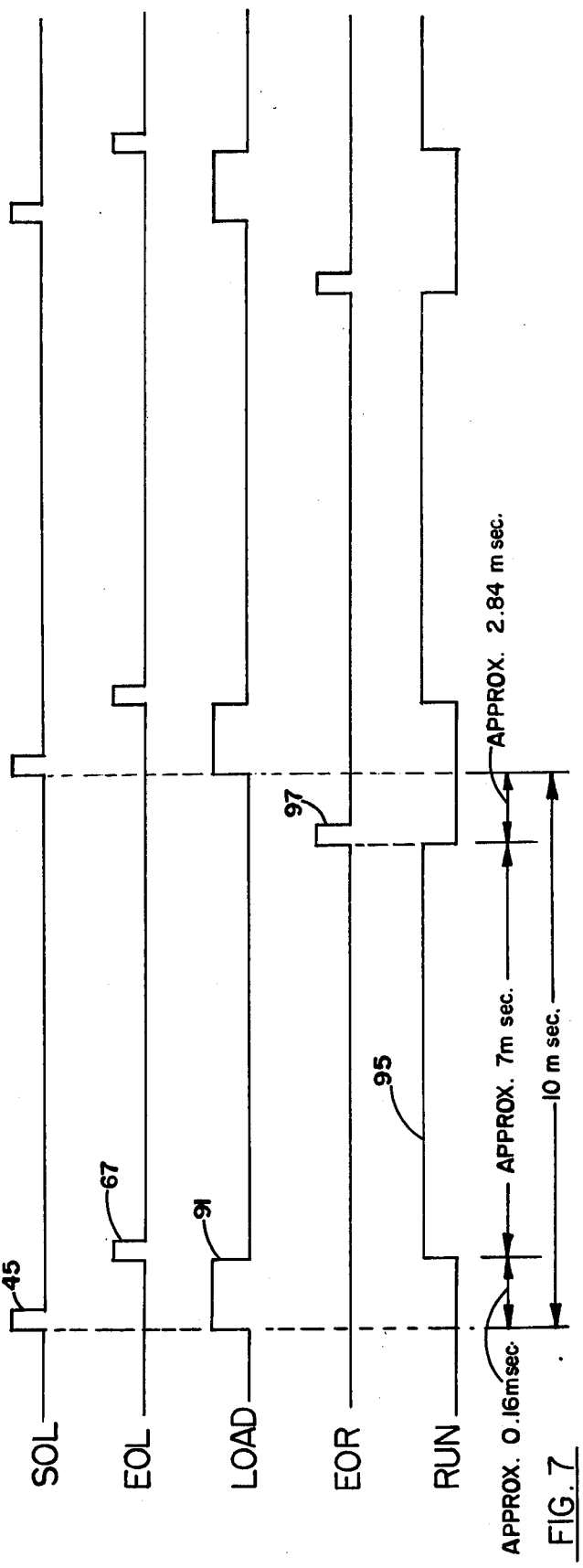
FIG. 7 illustrates waveforms useful in explaining the operation of the central control of FIG. 6.

In FIG. 6, the SOL pulse 45 (FIGS. 3, 4 and 7) sets a load flip flop 89 to start the LOAD state of operation by initiating a "1" state load gate 91 at its Q output. Approximately 160 microseconds later, the EOL pulse 67 (FIGS. 3, 4 and 7) resets the load flip flop 89 to terminate the load gate and hence end the LOAD state of operation. At the same time that the EOL pulse resets the load flip flop 89, it sets a run flip flop 93 to start the RUN state of operation by initiating a "1" state run gate 95 at its Q output. After approximately 7 milliseconds, a "1" state End Of RUN (EOR) pulse or bit 97 is applied from a mask unit 99 in FIG. 5 to reset the run flip flop to terminate the run gate 95, and hence end the RUN state of operation. The duration of the LOAD and RUN states of operation are respectively determined by the durations of the load and run gate signals 91 and 95. A new STV is generated during each LOAD state, while all correlations are made within the RUN state. As indicated in the waveform 95 after the termination of the run gate, there is approximately 2.84 milliseconds before the next SOL pulse 45. This time of 2.84 milliseconds allows for an additional delay of up to 2.84 milliseconds before the EOR pulse is applied to terminate the RUN gate 95, should the system so require a longer RUN state operation.

The run gate 95 and the 1 MHz clock pulses are applied to inputs of an AND gate 96. In addition, a binary "1" state trainer command signal (from trainer 105 in FIG. 5) is applied to an inverting input of the AND gate 96. This "1" state trainer command signal is only applied to disable the AND gate 96 when the trainer 105 desires to store new mask data in the mask unit 99 (FIG. 5). The operation of the trainer 105 and mask unit 99 will be explained later in relation to FIG. 8.

When no "1" state trainer command signal is applied to the AND gate 96, the AND gate is no longer in a disabled condition. This allows the central control 87 to generate signals that enable the RAM unit 85 and mask unit 99 to simultaneously perform a READ operation. This READ operation only occurs when a run gate signal, but no trainer command signal, is applied to the AND gate 96. When the run gate signal 95 is applied to the AND gate 96 during a READ operation, the run gate signal enables the AND gate 96 to pass 1 MHz clock pulses as "count" pulses. These "count" pulses are also delayed for about 100 nanoseconds (nsec) by a delay circuit 98 to develop "read" pulses. These count and read pulses are applied to both of the RAM and mask units 85 and 99 (FIGS. 8 and 10) to enable them to simultaneously read out their corresponding contents to perform correlations (to be discussed later). It can therefore be seen that the central control 87 is prevented from generating count and read pulses whenever the AND gate 96 is disabled by the application of the "1" state trainer command signal to its inverting input.

Referring back to FIG. 5, the count and read pulses from the central control 87 are respectively applied to a mask memory control 101 and a mask storage memory 103 in the mask unit 99 to enable the mask memory control 101 to control the READ/WRITE operations of the mask storage memory 103. The mask storage memory 103 may be a core memory with word address locations starting at location O and continuing sequentially until the end of the last stored word. Also associated with the mask unit 99 is the trainer 105, which may be a logic circuit or a computer. The trainer 105 trains or controls the mask unit 99 to store any desired dyads and/or triads which may comprise one or more desired keywords. To more clearly explain the operation of the mask unit 99, reference will now be made to FIG. 8.

Figure 8:
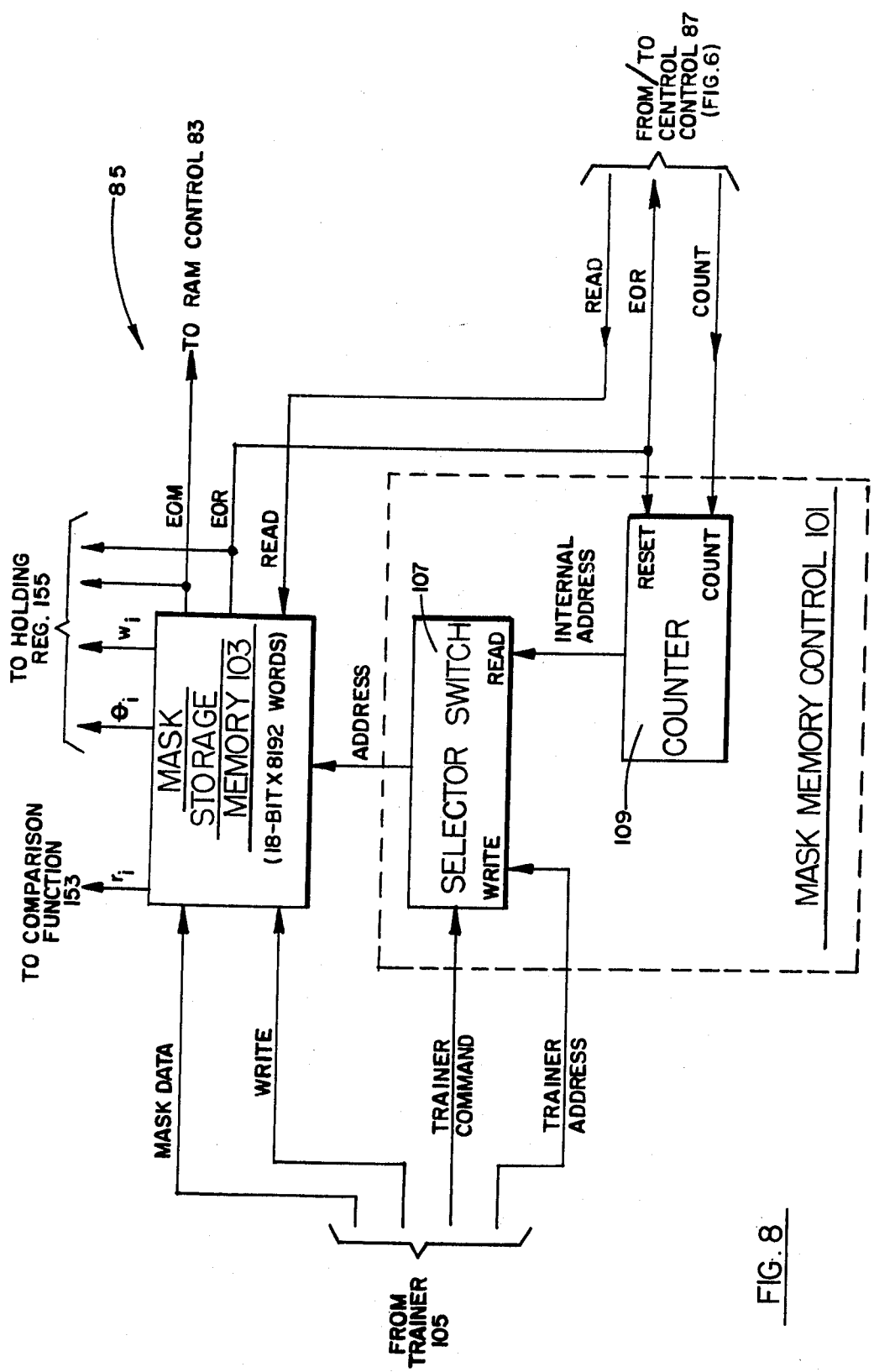
FIG. 8 is a block diagram of the mask unit of FIG. 5.

In FIG. 8, whenever the trainer 105 desires new data to be written into the mask storage memory 103, it sends a "1" state trainer command signal to a selector switch 107 in the mask memory control 101, as well as to the inverting input of the previously discussed AND gate 96 (FIG. 6). As stated before, the inversion of the "1" state trainer command signal disables the AND gate 96. At the same time the "1" state trainer command signal causes the selector switch 107 to only allow trainer addresses to pass through a "write" input of the switch 107 to the mask storage memory 103. Each "WRITE" command from the trainer 105 enables the mask storage memory 103 to allow mask data from the trainer 105 to be written into the mask storage memory 103 at the associated trainer address.

When no "1" state trainer command is applied to the selector switch 107 (and to the AND gate 96 of FIG. 6), internally generated addresses in the mask memory control 101 are passed through a "read" input of the selector switch 107 to the mask storage memory 103 for a READ operation. This READ operation can only occur when no "1" state trainer command signal is being applied to the selector switch 107 (and AND gate 95 in FIG. 6). During a READ operation, read and count pulses from the central control 87 (FIG. 6) are respectively applied to the mask storage memory 103 and to the "count" input of a counter 109. Each time that a count pulse is counted by the counter 109, an internal address is generated which passes through the "read" input of the selector switch 107 to the mask storage memory 103 as a "read" address. The read pulses, which as explained in relation to FIG. 6 are 100 nsec. delayed count pulses, enable the mask storage memory 103 to sequentially read out its contents during the RUN state. It should be noted that due to this 100 nsec delay between associated count and read pulses, each of the internal addresses from the counter 109 is in a stabilized condition before the read pulses command the mask storage memory 103 to sequentially read out its contents. Each time that a read pulse is applied to the mask storage memory 103, an eighteen-bit word, stored at the address location being internally addressed by the counter 109 at that time, is read out of the mask storage memory 103.

This eighteen-bit word can be sequentially comprised of 6 bits of amplitude information $r_i$, 5 bits of threshold information $\theta_i$, 5 bits of weighting information $w_i$, a first 1-bit signal and a second 1-bit signal. The first 1-bit signal changes from a binary "0" state to a binary "1" state "End of Mask" (EOM) signal at the end threshold each of the masks being read out of the mask storage memory 103 during a RUN state. The second 1-bit signal changes from a binary "0" state signal to a binary "1" state "End of Run" (EOR) signal after all of the masks have been read out of the mask storage memory 103 during a RUN state. This EOR signal is used to reset the counter 109 and, as mentioned before, to reset the flip flop 93 (FIG. 6) to terminate the run gate and RUN state. The counter 109 is reset to assure that the internal address from the counter 109 will be at 0 at the start of the next RUN state.

Figure 9:
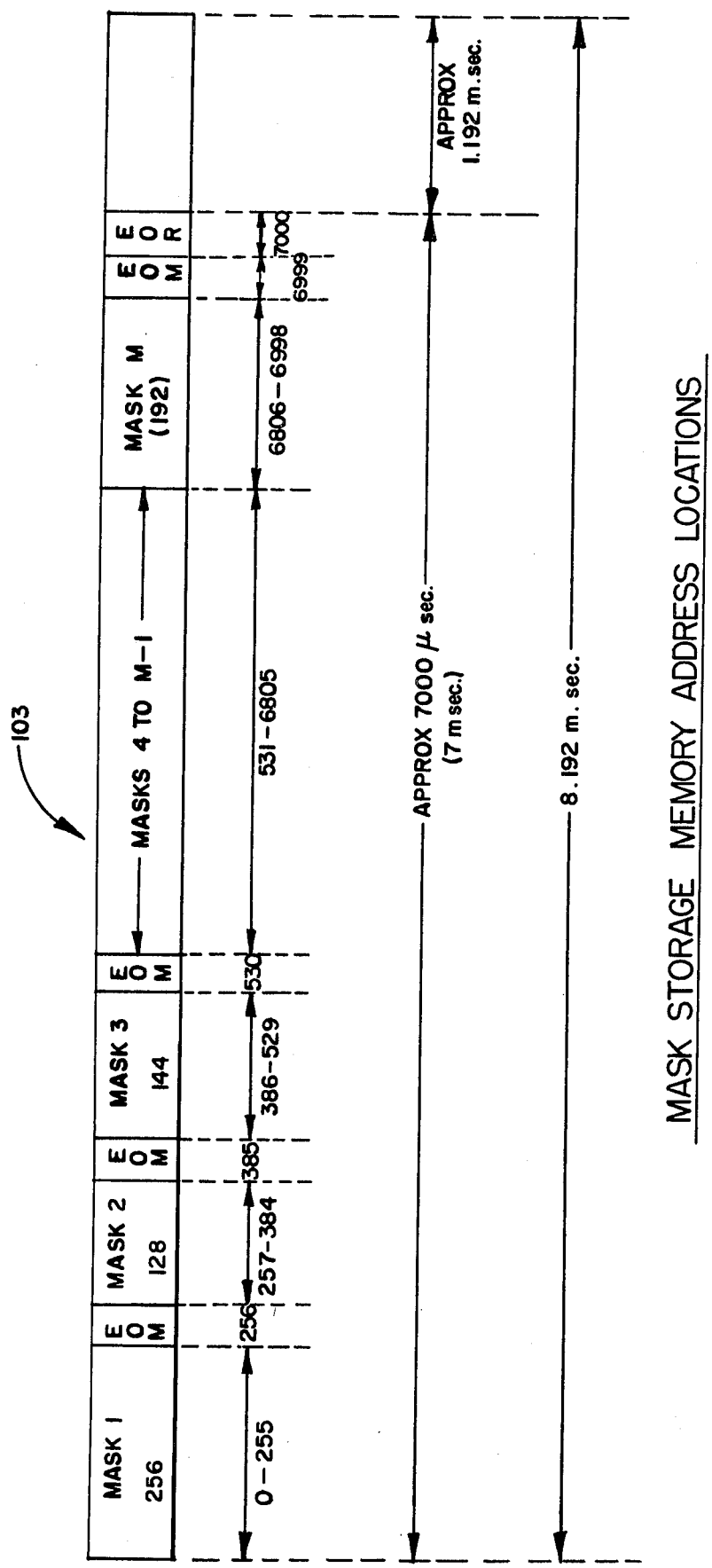
FIG. 9 illustrates the address locations of the mask storage memory circuit of FIGS. 5 and 8.

As indicated in FIGS. 5 and 8, the mask storage memory 103 has the capability of storing 8192 eighteen-bit words. This storage ability of the mask storage memory 103 is illustrated in FIG. 9. More specifically, FIG. 9 illustrates various exemplary address locations of the mask storage memory 103. It will be recalled that the stored masks can be of different lengths and that they can vary from 1 to 16 STVs in length. It should be further recalled that each STV was stated to be, for example, 16 words in length with each word being 6 bits wide. As a result, the masks can vary from 16 words in length to 256 words in length, with one dyad or triad being stored in each mask of the mask storage memory 103.

In the generation of each of the masks indicated in FIG. 9 to be stored in the memory 103, a skilled person having a reasonable command of acoustic phonetics finds or determines the mask data (dyad or triad) content and length of each mask by examining training spectrograms, i.e. spectrograms of samples of the desired keywords, so that he can train the system of the invention by controlling the operation of the trainer 105 of FIG. 5. To illustrate how such a skilled person can control the operation of the trainer 105 (FIG. 5), take the case where the trainer 105 is a computer. In this case, after examining spectrograms and finding the mask data, that skilled person controls the operation of the computer 105 by programming the computer 105 to address various address locations in the mask storage memory 103 and store or write new mask data (dyads and/or triads) into the various addressed locations of the mask storage memory 103.

In some cases multiple masks per dyad or triad will be used because of free variation and interspeaker effect. In the generation of multiple masks, that skilled person examines spectrograms to find perhaps 10 mask samples of a dyad or triad and typically groups them into, for example, three mask subgroups to span the free variation and interspeaker effects for that dyad or triad. Grouping, which is a common form of clustering, can be carried out on the basis of conventional pattern recognition clustering techniques, which are well known in the art, and described, for example, in the publication of Keinosuke Fukunaga, entitled "Introduction to Statistical Pattern Recognition", Academic Press, New York, 1972, pages 323 – 355 (Chapter 11).

Free variation may be defined as the utterance of different phonetic representations or sounds conveying the same semantic information. More specifically there is an ideal way of saying something. Each person has a free variation of speaking from the ideal way. This free variation can be caused by dialect, prosody (an emotional utterance by the speaker) or sentence stress. Three types of free variation which may occur are the substitution of one sound for another ("da" or "tha" for "the"), the omission of a sound ("pat" instead of "part") and the insertion of a sound in a keyword (adding "uh" to the end of "park"). Interspeaker effect or variation may be defined as occurring when the utterance of the same sound by different speakers results in different characteristic resonances for that same phonetic event.

After grouping the above-noted 10 mask samples into three mask subgroups, corresponding components in the masks in each of the three mask subgroups are then averaged to form a single mask for that dyad or triad in that subgroup. The three multiple masks for a dyad or triad are then serially stored in the memory 103 in contiguous locations and would be subsequently processed in parallel.

It should be recalled that there are approximately 44 different sounds or phonetic events in the English language and that the recognition system of this invention is based upon dyads and/or triads where a dyad is two phonetic events and a triad is three phonetic events. Therefore, there could be approximately 1936 different dyads and/or triads. However, if 500 to 700 dyads and/or triads were utilized in this system, probably well over 90% of the keywords in a standard English dictionary could be recognized.

With one dyad or triad being stored in each mask of the mask storage memory 103, the system of this invention could have an unlimited vocabulary if enough masks were used and the system were implemented large enough to compute a decision output for each of the desired keywords. The invention thus has the capability of unlimited vocabulary recognition in continuous speech. However, the system could also be utilized for limited vocabulary recognition in such exemplary applications as: baggage routing; zip code usage; remote data entry over a telephone, such as for sales orders; voice augmented word recognition to control the operation of machinery in a factory or the internal operation of an airplane; and selected word spotting, or a presorting of speech by setting the system to recognize a limited number of keywords of interest in communications broadcasts. In a limited vocabulary recognition utilization, the masks in the mask storage memory 103 could be grouped together in sequence to define the keyword or keywords to be recognized, but this is not absolutely necessary. It should be understood that the difference between these capabilities of unlimited and limited vocabulary recognition lies only in the amount of duplication of equipment implemented into the system.

Since, as previously stated during the discussion of FIG. 8, each word in the mask storage memory 103 can be read out in 1 $\mu$sec due to the application of the 1 MHz count and read pulses, it would take 8192 $\mu$sec or 8.192 msec to read out all of the words in the memory 103 if the memory 103 were filled. However, only approximately 7000 eighteen-bit words are shown in FIG. 9 as being stored in the memory 103, with the memory 103 having the capability of storing an additional 1192 eighteen-bit words in the remaining 1.192 msec if the operation of the system so requires.

M masks are shown in FIG. 9 as being stored in the memory 103. The word length of each mask is shown directly below the mask number while the address locations of the words in each mask are indicated by the associated range of numbers. For example, mask 2 is 128 eighteen-bit words in length, with these words being located in address locations 257 through 384, (binary address locations of 000010000001 through 000011000000). The "1" state EOM signal is contained in the word (000000000000000010) following each of the masks to indicate the end of that mask. For example, the binary word 000000000000000010 containing the "1" state EOM signal can be found at address location 385 (binary address location 000011000001) which follows the end of mask 2. The "1" state EOR signal is contained in the word (000000000000000001) contained in address location 7000 (binary address location 1101101011000) following the EOM signal that follows the last mask (mask M) stored in the memory 103. It will be recalled that this EOR signal is used in FIG. 6 to reset the run flip flop 93 to terminate the run gate, and in FIG. 8 to reset the counter 109.

Returning now to FIG. 5, as stated before STV data and data available signals from the ADC 73 (FIG. 3) are respectively applied to the RAM 81 and RAM control 83 in the RAM unit 85. In addition, the EOL signal from the delay circuit 65 (FIG. 3), the EOM signals from the mask storage memory 103, and the load gate signal and count pulses from the central control 87 are applied to the RAM control 83, while the read pulses from the central control 87 are applied to the RAM 81. To more completely explain the operation of the RAM unit 85, FIGS. 10, 11A and 11B will now be referred to.

Figure 10:
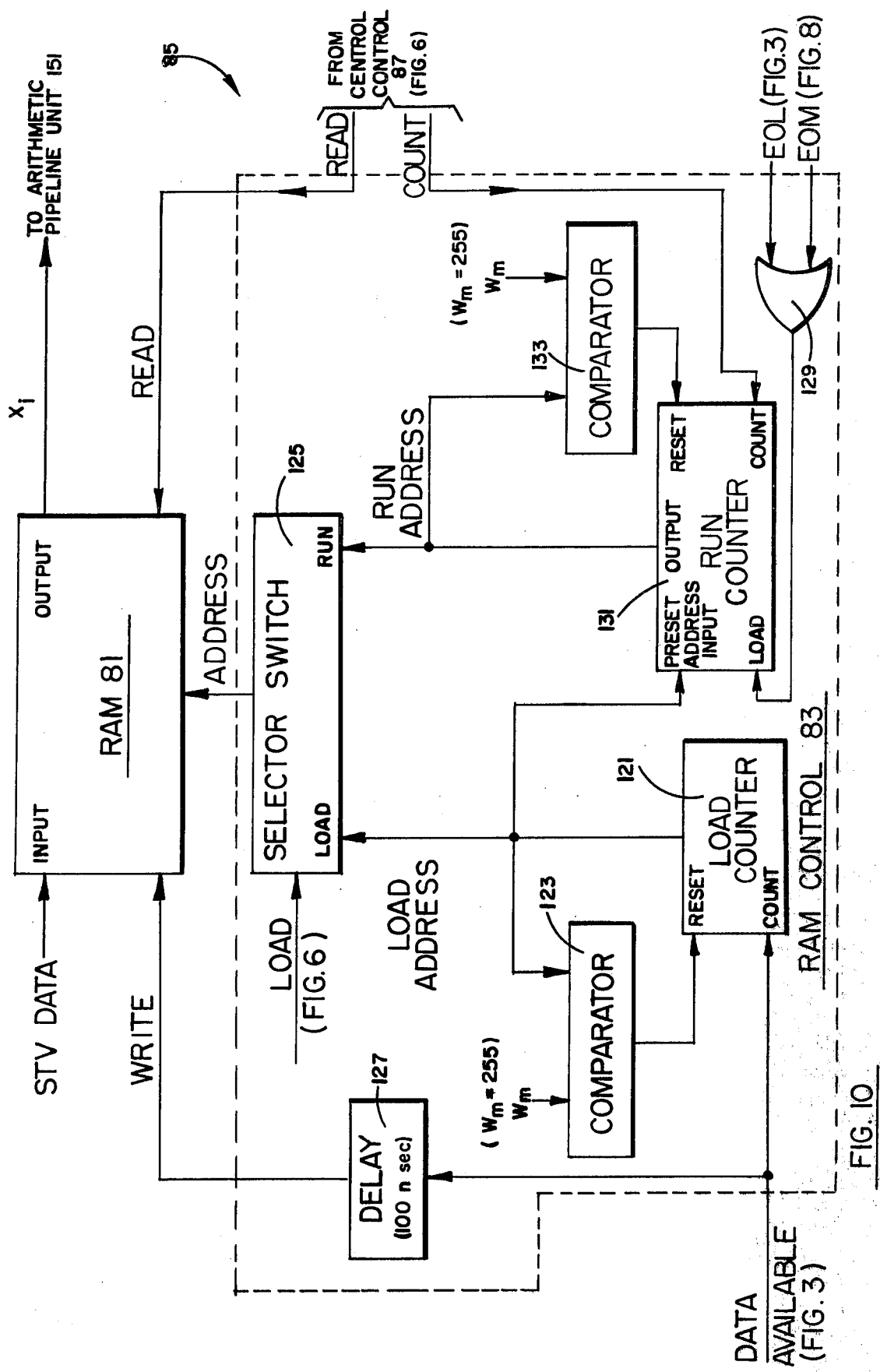
FIG. 10 is a block diagram of the RAM unit of FIG. 5.

The RAM 81 in FIG. 10 (and FIG. 5) corresponds to a spectrogram, with the frequency components in the STVs stored therein being vertically disposed along a vertical frequency axis and adjacent ones of the sequence of stored STVs being separated by 10 msec of time from each other along an orthogonal time axis. Every 10 msec a new STV is stored in the RAM 81. By this means a pattern starts developing which forms the spectrogram. The RAM 81 may be solid state and have a word length that is panel-selectable between 1 and 1024 locations. In operation, the RAM 81 must have a word-storage length at least as long as that of the longest mask stored in the mask storage memory 103. Each of the masks, as shown in FIG. 9, must have a word length equal to some integral multiple of 16 words, since a mask can be between 1 through 16 STVs in length and each STV includes 16 digitized spectral estimates or words in length. Since the longest mask shown in FIG. 9 (mask 1) is 256 words long, or the equivalent of 16 STVs long, let us henceforth assume that the selected word length of the RAM 81 is such that the RAM 81 stores 256 words or 16 STVs at any given time.

Figure 11B:
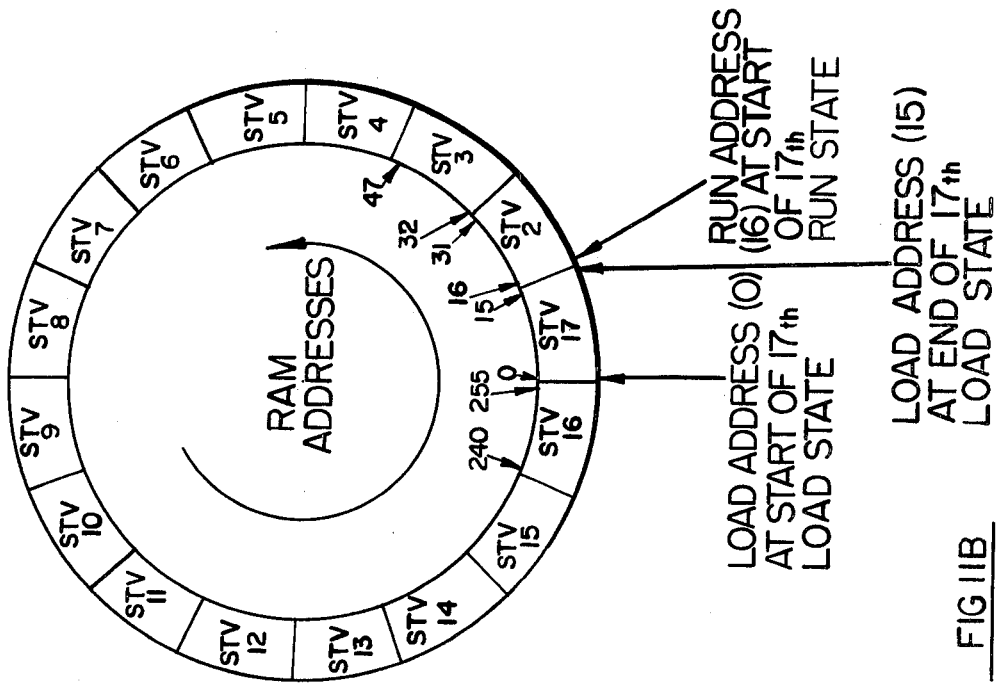
FIGS. 11A and 11B illustrate the STV address locations in the RAM of FIGS. 5 and 10 during selected LOAD and RUN states.
Figure 11A:
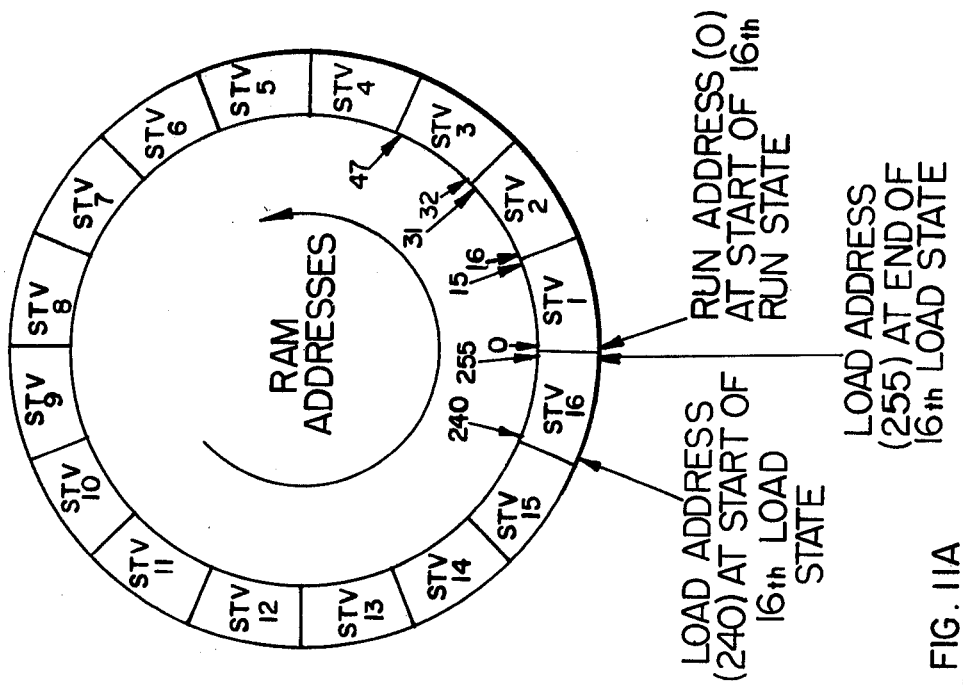

The address locations for the 16 STVs stored in the RAM 81 during various LOAD and RUN states are illustrated in FIGS. 11A and 11B. MODULO or rollover addressing is utilized for the RAM 81. The address locations for the 256 words stored in the RAM 81 range from 0 through 255. Since 255 is the highest numbered address location, the addressing is called MODULO 255 addressing. In MODULO 255 addressing, the RAM 81 operationally resembles a circle when it is addressed, as indicated in FIGS. 11A and 11B. In either of the LOAD or RUN states, when address location 255 is reached, the next addresses in that operational state start with 0 and increase in the direction indicated by the arrow in FIG. 11A or 11B.

FIG. 11A illustrates STVs 1 through 16, with STV 1 being stored in load address locations 0–15, STV 2 being stored in load address locations 16–31, STV 3 being stored in load address locations 32–47, . . . and STV 16 being stored in load address locations 140–255. In FIG. 11A, STV 1 is the oldest STV since it was stored first, while STV 16 is the newest STV since it was stored last. During the sixteenth LOAD state the 16 digitized spectral estimates, or frequency component words, in STV 16 were sequentially stored in load address locations 240–255. The first digitized spectral estimate in STV 16 was written into load address location 240 at the start of the sixteenth LOAD state and the last or sixteenth digitized spectral estimate in STV 16 was written into load address location 255 at the end of the sixteenth LOAD state.

Since the RAM 81 stores 256 words in 256 address locations, a synchronous load counter 121, which supplies load addresses to the RAM during the LOAD state, must likewise have 256 address counts or load addresses. These 256 address counts range from 0 (00000000) through 255 (11111111). Assume, for purposes of this discussion, that the last count or load address of the synchronous counter 121 was 255, as illustrated in FIG. 11A at the end of the sixteenth LOAD state. This 255 count is compared with a fixed number $W_M$ in a comparator 123. The comparator 123 can be a set of AND gates. The number $W_M$ is panel-selected to be equal to the last or largest load address required of the load counter 121, which is 255 in the present discussion. When the count of the counter 121 becomes equal to $W_M$, or 255, the comparator 123 develops and applies a "1" state signal to the "reset" input of the counter 121. The synchronous counter 121 operates such that, whenever a "1" state signal is applied to its reset input, the next data available signal 75 (FIG. 4) applied from the ADC 73 in FIG. 3 to its "count" input will cause the load counter 121 to reset to a zero address count (00000000).

During the next or, for example, seventeenth LOAD state, the load signal 91 (FIG. 7) is applied from the load flip flop 89 (FIG. 6) to a selector switch 125 to enable the RAM control 83 to operate in the LOAD state. During this seventeenth LOAD state, the 16 data available pulses 75 from the ADC 73 (FIG. 3), that occur during the generation of STV 17, are applied to the "count" input of the load counter 121. Since it was previously stated that at the end of the sixteenth LOAD state the count of the counter 121 was at 255, the first data available pulse during the next or seventeenth LOAD state resets the counter 121 to a zero count, as illustrated in FIG. 11B at the start of the seventeenth LOAD state. Each one of the remaining 15 data available pulses causes the counter 121 to change its output load address by a count of 1. During the seventeenth LOAD state, the counter 121 therefore develops load addresses of 0, 1, 2 . . . 15. During the application of the seventeenth LOAD signal to the selector switch 125, the 16 load addresses from the counter 121 are sequentially passed through a "load" input of the selector switch 125 to the RAM 81.

Each of the 16 data available pulses occurring during each LOAD state is delayed approximately 100 nanoseconds (nsec) by a delay circuit 127 before being applied as a "write" command signal to the RAM 81. Consequently, each of the load addresses is in a stabilized condition before the "write" signals command the RAM 81 to write in the 16 digitized spectral estimates in the STV being applied to the input of the RAM 81. It should be recalled that each of these digitized spectral estimates is a word 6 bits wide.

During the seventeenth LOAD state the 16 digitized spectral estimates in STV 17 are sequentially written into the load address locations 0–15 of the RAM 81, as illustrated in FIG. 11B. The first spectral estimate in STV 17 is written into load address location 0, and the last spectral estimate in STV 17 is written into load address location 15. In comparing FIGS. 11A and 11B it can be seen that at the end of the seventeenth LOAD state, STV 17 has been written into the load address locations 0–15 that were formerly occupied by STV 1, which was the oldest stored STV at the end of the sixteenth LOAD state, while STVs 2–16 remain in the address locations that they occupied at the end of the sixteenth LOAD state. During the eighteenth LOAD state (not illustrated) STV 2 will be discarded while STV 18 is being written into load address locations 16–31. It can therefore be seen that every 10 msec. a new STV is stored in the RAM 81, while the oldest STV is being discarded. As a result, at any given time the RAM 81 holds 0.16 seconds or 160 msec. of digitized spectral estimates or digitized spectral parameters of continuous speech.

As explained in relation to FIG. 6, the generation of the EOL pulse (FIG. 3) terminates the load signal 91 to terminate the LOAD state and initiates the run signal 95 to start the RUN state. The EOL pulse also passes through an OR gate 129 to the "load" input of a run counter 131. The run counter 131 is a preset counter which is enabled by the EOL pulse to load in, or apply to its "output", the current preset address. The current preset address may be defined as the last load address that is being applied from the load counter 121 to the "preset address input" of the counter 131 at the time that the EOL pulse is being generated. This preset address appears at the "output" of the run counter 131 before the counter 131 starts counting during the following RUN state.

When the load signal 91 is terminated by the EOL pulse at the completion of a LOAD state, the RAM control 83 starts operating in the RUN state. If no "1" state trainer command signal is generated by the trainer 105, as previously discussed in relation to FIG. 6, read and count pulses from the central control 87 (FIG. 6) are respectively applied to the RAM 81 and to the "count" input of the run counter 131.

The first 1 MHz count pulse that occurs during the RUN state causes the output run address count of the run counter 131 to increment by a count of 1. As a result, the first run address that appears at the "output"

of the counter 131 at the start of the RUN state is one count greater than the current preset address (or last load address in the prior LOAD state). For example, as illustrated in FIG. 11A, the last load address count at the end of the 16th LOAD state is 255. During the 16th RUN state, the run address from the counter 131 starts with a run address count that is one greater than the last load address of 255 namely zero. Each of the subsequent 1 MHz count pulses, that occur within the period of time that a mask is being read out of the memory, causes the counter 131 to increment its output run address count by an additional count of 1.

Each run address count from the run counter 131 is compared in a comparator 133 with the number $W_M$, which in this illustration is equal to 255. If the run address count does not reach 255 before the end of a mask is reached, an EOM pulse or signal associated with that mask is passed through the OR gate 129 to enable the counter 131 to load into its "output" the current preset address. By this means the run addresses that sequentially occur when the following mask is being read out start with an address count that is one greater than the current preset address and increment upward until the end of that following mask. On the other hand, whenever the run address count of the counter 131 reaches 255 before the end of a mask, the comparator 133 generates and passes a "1" state signal to the "reset" input of the run counter 131. This "1" state signal enables the counter 131 to be reset to a zero address count by the next 1 MHz count pulse that occurs. In this manner the run counter 131 can count up from its current preset address to a count of 255, then continue counting from zero upward to the end of a mask, at which time an EOM pulse is generated.

As indicated above, at the end of each mask that is read out of the mask storage memory 103 (FIG. 8) an EOM pulse is passed through the OR gate 129 to the "load" input of the run counter 131. Each EOM pulse operates, as did the EOL pulse at the end of the previous LOAD state, to enable the counter 131 to apply the preset address to its "output" before the start of the reading out of the next mask.

The first 1 MHz count pulse, that occurs during the time that the next mask in that same RUN state is being read out, causes the run address count to again be one greater than the current preset address. During any given RUN state, the preset address remains the same for each mask being read out. During the following RUN state, the preset address for that following RUN state differs from that of the former RUN state by a count of 16. For example, as shown in FIGS. 11A and 11B, the preset address (or last load address) at the end of the 16th LOAD state, and hence during the 16th RUN state, is 255, while the preset address immediately before and during the 17th RUN state is 15. In a like manner, the preset addresses for the 18th, 19th and 20th RUN states (not shown) would be 31, 47 and 63, respectively.

It can be seen from the above description of the operation of the run counter 131 that, during any given RUN state, the prior EOL pulse loads the current preset address into the counter 131 for the first mask being read out during that given RUN state, and the EOM pulses respectively load the current preset address into the counter 131 for the subsequent masks being read out of the memory 103 during that given RUN state. As a result, at the start of any given RUN state and at the beginning of each mask being read out during that RUN state, the proper preset address is loaded into the run counter 131. This assures that the RAM 81 will be properly addressed when a new mask is being read out of the mask storage memory 103 during any given RUN state. In this manner, proper timing can be obtained in the correlation of each of the masks in the memory 103 with the STVs stored in the RAM 81.

The reason for starting the run addresses (during the RUN state) at a count one greater than the last load address in the prior LOAD state is that the sequence of STVs to be correlated with each stored mask starts from the oldest STV and proceeds toward the newest STV. It has been previously indicated that, in relation to FIG. 11A, STV 16 is the newest STV that is stored in the RAM 81 after the sixteenth LOAD state and that STV 16 is located in RAM load address locations 240–255. Therefore, during the sixteenth RUN state, the run addresses for each mask start at 0 and sequentially increase upward until the end of that mask, after which time the run addresses for the following mask start at 0 and sequentially increase upward until the end of that following mask, etc. In a like manner, as indicated in FIG. 11B, during the seventeenth RUN state, the run addresses for each mask start at 16, which is one more than the last load address of 15 that occurred at the end of the seventeenth LOAD state, and increase upward to the end of that mask, etc.

During a RUN state the run addresses from the run counter 131 are applied through a "run" input of the selector switch 125 to the RAM 81, since no load signal is being applied to the switch 125 during the RUN state.

It will again be recalled that the read pulse being applied to the RAM 81 are 100 nsec-delayed count pulses. As a result, the run addresses occurring during a RUN state are in a stabilized condition before the read signals or pulses command the RAM 81 to sequentially read out words equal in number to the number of words contained in the mask being read out of the mask storage memory 103 at that time.

Each time that a run address and a read pulse are applied to the RAM 81 during the RUN state, a 6-bit wide word is read out of the RAM 81. The 6-bit words that are read out of the RAM 81 during a RUN state are designated as the $x_i$ signal.

Referring back to FIG. 5, it will be recalled that the RAM 81 is updated during the LOAD state portion of each 10 msec period by storing the newest STV while discarding the oldest STV. Also, during the RUN state portion of each 10 msec period, all of the word components in each mask in the mask storage memory 103 (FIGS. 8 and 5) are correlated with corresponding word components stored in the RAM 81, by computing a sequence of correlation functions on a component by component basis and summing all of the correlation functions to develop a correlation data signal for each mask. To achieve this correlation, as indicated in FIG. 5, the $x_i$ signal from the RAM 81, along with the $r_i$, $\theta_i$, $w_i$, EDM and EOR signals from the mask storage memory 103, are applied to an arithmetic pipeline unit 151, which will now be more fully discussed.

The arithmetic pipeline unit 151 performs a series of mathematical operations in correlating the $x_i$ signal with the output of the mask storage memory 103. The pipeline unit 151 is composed of four sequential arithmetic functions, each of which may be separated by a holding register from the adjacent arithmetic function. More specifically, the arithmetic pipeline unit 151 is comprised of a comparison function circuit 153, holding registers 155, 159 and 163, threshold and weighting function modifiers 157 and 161, and a sum accumulator 165. The holding registers 155, 159 and 163 are conventional circuits well known in the art. However, there are different ways in which the comparison function circuit 153 and threshold and weighting function modifiers 157 and 161 can be implemented, depending upon the type of correlation being utilized in the arithmetic pipeline unit 151. The various implementations of the circuits 153, 157 and 161, as well as the implementation of the sum accumulator 165, will be discussed later. At this time only a generalized discussion of the operation of the circuits of the arithmetic pipeline unit 151 will be given.

At each 1 MHz "read" pulse time during the RUN state, a 6-bit word $x_i$ is read out of the RAM 81 and the eighteen-bit word (comprised of the 6-bit word $r_i$, the 5-bit word $\theta_i$, the 5-bit word $w_i$, the 1-bit EOM and the 1-bit EOR) is read out of the mask storage memory 103. The $x_i$ and $r_i$ words are utilized by the comparison function 153 to generate a $c_i$ word. This $c_i$ word may vary up to 12 bits in width, depending upon the type of correlation operation being performed by the arithmetic pipeline unit 151. The $c_i$, $\theta_i$ and $w_i$ words and EOM and EOR bits are clocked into and temporarily stored in the holding register 155 during each 1 MHz clock pulse period.

The $c_i$ and $\theta_i$ words from the holding register 155 are selectively utilized by the threshold function modifier 157 to generate a $t_i$ word, which may vary up to 12 bits in width, depending upon the type of correlation operation being performed by the pipeline unit 151. The $t_i$ word from the function modifier 157, and the $w_i$ word and EOM and EOR bits from the holding register 155 are clocked into and temporarily stored in the holding register 159 during each 1 MHz clock pulse period.

The $t_i$ and $w_i$ words from the holding register 159 are selectively utilized by the weighting function modifier 161 to develop an $m_i$ word, which may vary up to 12 bits in width, depending upon the type of correlation operation being performed by the pipeline unit 151. The $m_i$ word from the function modifier 161 and the EOM and EOR bits from the holding register 159 are clocked into and temporarily stored in the holding register 163 during each 1 MHz clock pulse period.

At each 1 MHz clock pulse time during the run gate, the data in a new $m_i$ word is applied to the sum accumulator 165 and added to what has been previously accumulated. Each new data sum is an 18-bit correlation data word $d$, which is developed as an output of the arithmetic pipeline unit 151. At the end of each of the masks being read out of the mask storage memory 103, a "1" state EOM signal from the holding register 163 is applied through a 100 nsec delay circuit 167 to the sum accumulator 165 to clear the accumulator 165 for the start of the next mask.

Individual correlation operations between the reference mask templates (read out of the memory 103) and the digitized parameters of continuous speech (read out of the RAM 81) are computed using a discriminant function. The arithmetic pipeline unit 151 could be implemented to perform any one of many different types of discriminant functions or correlation operations. A different discriminant function, and its associated mathematical operations, are mathematically depicted in FIG. 12 for each of five exemplary types of arithmetic pipeline units 151. These five types of discriminant functions are:

| TYPE | DISCRIMINANT FUNCTION |
|---|---|
| #1 | Threshold Distance Function |
| #2 | Unweighted Absolute Value Distance Function |
| #3 | Weighted Absolute Value Distance Function |
| #4 | Euclidean Distance Squared Function |
| #5 | Dot Product of Two Vectors Function |

For the purpose of the following discussion in relation to FIGS. 12 and 5, let $r_i$ refer to the components of a given mask expressed as vectors and $x_i$ refer to the corresponding components of digitized parameterized speech (digitized spectral parameters) being compared.

The metric for measuring degree of match between two vectors $r_i$ and $x_i$ having weight vector $w_i$ and threshold vector $\theta_i$ can, in general, be expressed as:

$$d = \sum_{i=1}^{n} w_i F_i$$

where $$F_i = F(r_i, x_i, \theta_i),$$

$n$ = number of components or words in the given mask and $i = 1, 2 \ldots, n$.

Here the vectors are:

$$r_i = r_1, r_2, \ldots, r_n$$

$$x_i = x_1, x_2, \ldots, x_n$$

$$w_i = w_1, w_2, \ldots, w_n$$

$$\theta_i = \theta_1, \theta_2, \ldots, \theta_n$$

In addition, independence is assumed between components.

The discriminant function for the solution of $d$ in the above general equation, or in FIG. 12, may or may not employ thresholds ($\theta_i$), and the weight ($w_i$) assigned to each dimension may be unity. For example, as seen in FIG. 12, the unweighted absolute value distance function of type #2 employs only vectors $x_i$ and $r_i$, where $$F_i = |x_i - r_i| \text{ and } w_i = 1.$$

Likewise, the Euclidean distance squared function of type #4 is implemented using $$f_i = (x_i - r_i)^2, \text{ where } w_i = 1.$$

and the dot product of two vectors function of type #5 is implemented using $$F_i = x_i r_i, \text{ where } w_i = 1.$$

On the other hand, the weighted absolute value distance function of type #3 employs the vectors $x_i$, $r_i$ and $w_i$ even though $$F_i = |x_i - r_i|.$$

And the threshold distance function of type #1 employs all of the vectors $x_i$, $r_i$, $\theta_i$ and $w_i$, wherein $$F_i = F(|x_i - r_i|, \theta_i).$$

The minimum value of $d$ in the equation $$d = \sum_{i=1}^{n} w_i F_i$$

or at the output of the sum accumulator 165 corresponds to the closest match in the correlation of $x_i$ and $r_i$.

As shown in FIG. 12, for most comparison functions $c_i$ the relationship between $x_i$ and $r_i$ can be expressed in terms $c_i = |x_i - r_i|$, as shown in type numbers 1 through 4. By introducing this different expression in place of $x_i$ and $r_i$ the independence function is modified significantly. The previously stated assumption of independence between individual components of $x_i$ and $r_i$ is no longer required. The new assumption is that $|x_i - r_i|$ (where $i = 1, 2 \ldots n$) be independent. The former assumption is widely employed in pattern recognition even though it is obviously not valid. With the new assumption, however, a greater degree of validity exists. Assumed is only that interfeature noise is independent.

The comparison functions 153 for type numbers 1 through 4 each have the property of requiring that the differential $|x_i - r_i|$ be small for a good match, and only a few large differentials can cause a poor metric.

A modification in the threshold function modifier 157 to the comparison function of type #1 limits the extent to which a single component may degrade the match metric. Such a limit usually employs a threshold and is illustrated in the threshold distance function of type #1.

Figures 13A, 13B:
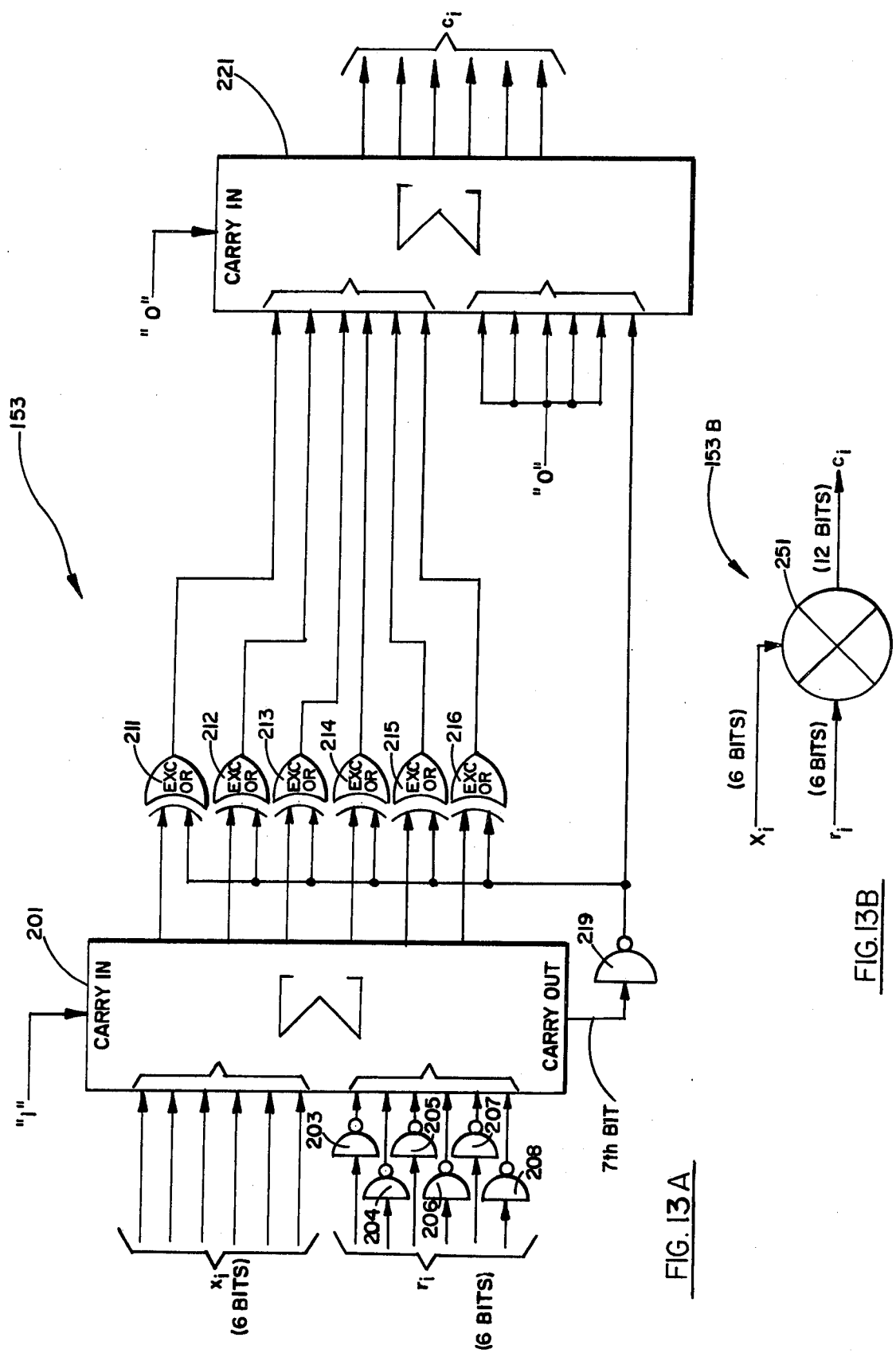
FIGS. 13A and 13B illustrate two different implementations for the comparison function of FIGS. 5 and 12.
Figure 15A:
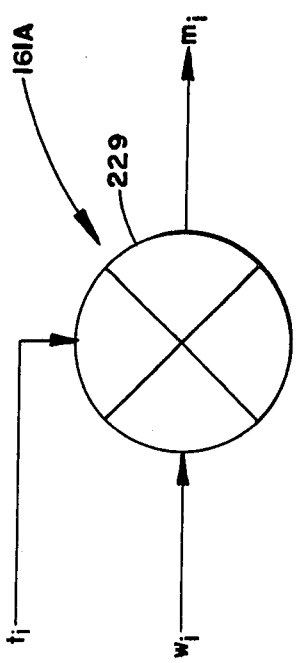
FIGS. 15A and 15B illustrate two different implementations for the weighting function modifier of FIGS. 5 and 12.
Figure 15B:
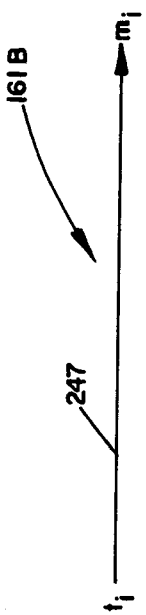
Figure 14A:
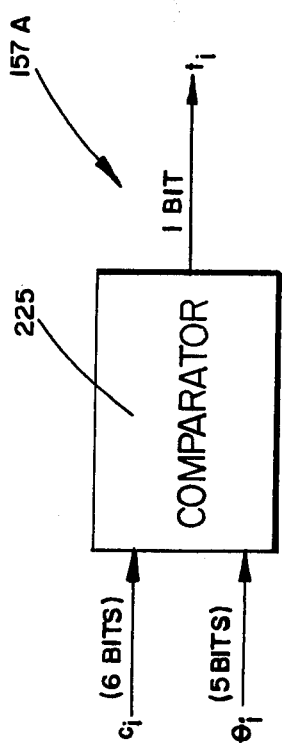
FIGS. 14A, 14B and 14C illustrate three different implementations for the threshold function modifier of FIGS. 5 and 12.
Figure 14B:
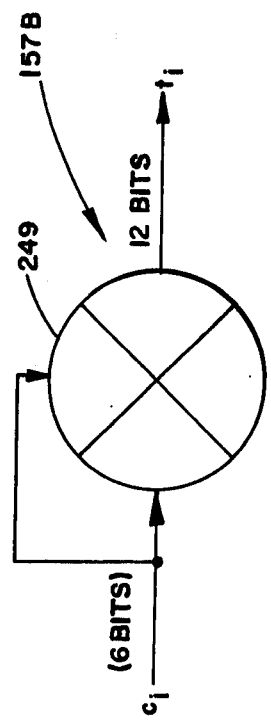
Figure 14C:
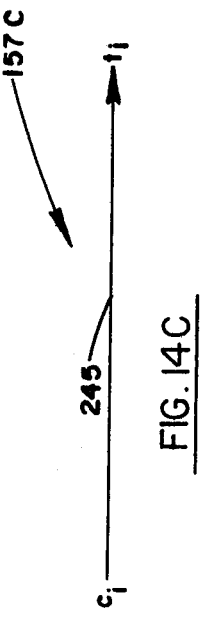
Figure 16:
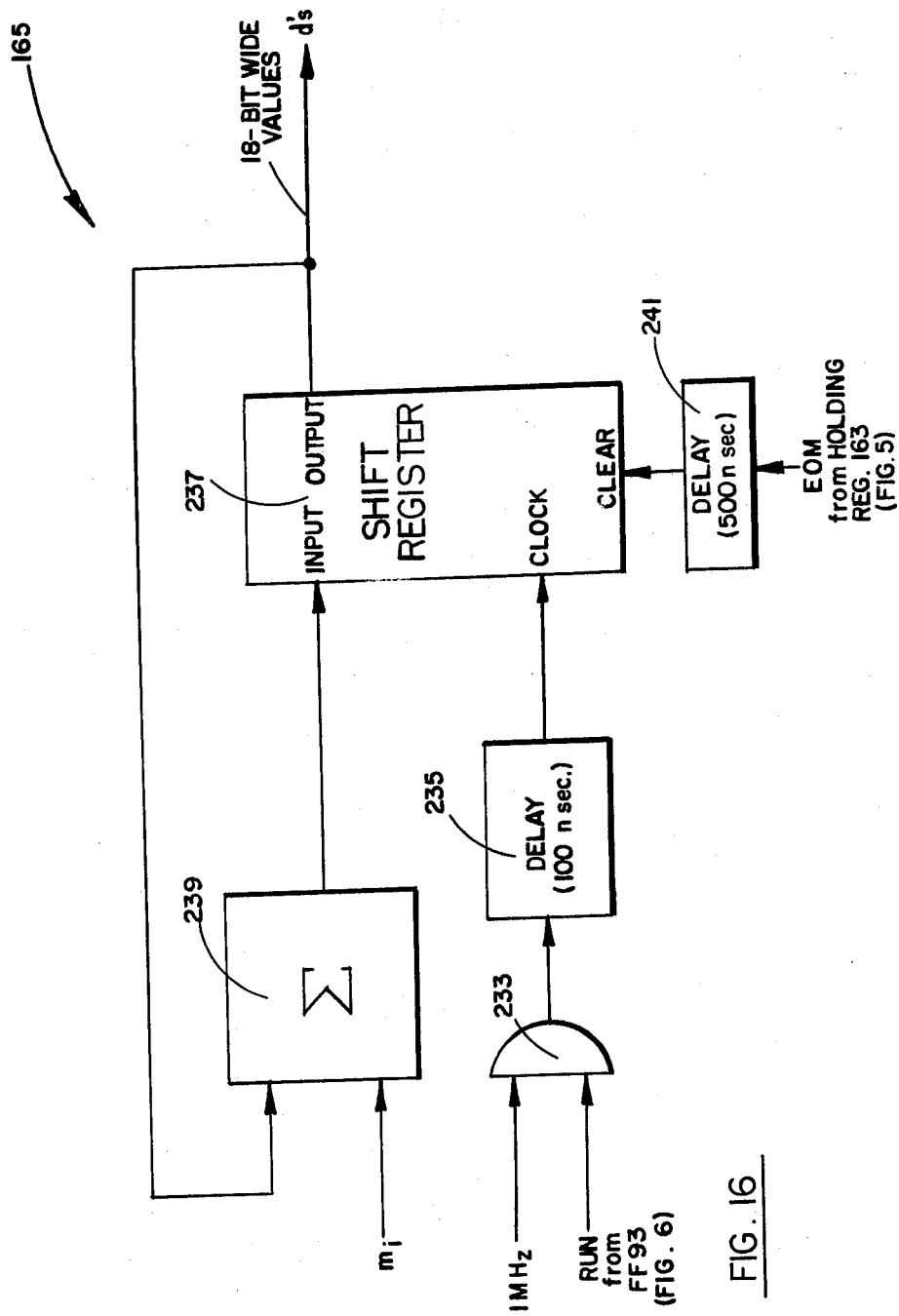
FIG. 16 is a block diagram of the sum accumulator of FIGS. 5 and 12.

To more specifically describe the five above-noted exemplary types of arithmetic pipeline units 151, reference will again be made to FIG. 12, as well as to two types of comparison functions 153 illustrated in FIGS. 13A and 13B, three types of threshold function modifiers 157 illustrated in FIGS. 14A, 14B and 14C, two types of weighting function modifiers 161 illustrated in FIGS. 15A and 15B, and the sum accumulator 165 illustrated in FIG. 16.

In type #1, the "threshold distance function" operation may be defined as the sum of the $i$ weighted ($w_i$) absolute values of the differences between corresponding components of the quantities $x_i$ and $r_i$, where the differences are less than the preselected threshold value of the quantity $\theta_i$ and where $i = 1, 2 \ldots n$. This first function may be expressed as:

$$\sum_{i=1}^{n} w_i \{|x_i - r_i|, \theta_i\},$$

where $i = 1, 2, \ldots n$ and $n =$ the number of words in a given mask. It can be seen in this type #1 function that both the thresholds $\theta_i$ and weights $w_i$ are used.

In the explanation of the threshold distance function operation of arithmetic pipeline unit type #1, the specific comparison function circuit 153A of FIG. 13A, the specific threshold function modifier 157A of FIG. 14A, and the specific weighting function modifier 161A of FIG. 15A, as well as the sum accumulator 165 of FIG. 16, will now be referred to.

The comparison function circuit 153A of FIG. 13A develops $c_i$, or the absolute values of the difference between corresponding components of the two numbers or quantities $x_i$ and $r_i$. More specifically, the 6-bit $x_i$ signal is directly applied to a combiner circuit 201, while the 6-bit $r_i$ signal is complemented by logical inverters or NAND gates 203-208 before being applied to the combiner 201. To enable the combiner 201 to develop a 2's complement arithmetic output, a binary "1" is also applied to the combiner 201 to be added to the complemented $r_i$ signal. The $x_i$, $\bar{r}_i$ and "1" signals are summed in the combiner 201 to develop an output signal of 6 bits, which 6 bits are respectively applied to associated first inputs of exclusive-OR gates 211-216. A carryout bit from the combiner 201 is logically inverted by NAND gate 219 before being applied to second inputs of the exclusive-OR gates 211-216. A "1" state carryout from the combiner 201 is inverted by the NAND gate 219 to cause the exclusive-OR gates 211-216 to act as repeaters of the associated bits applied to their first inputs. Conversely, a "0" state carryout from the combiner 201 is inverted by the NAND gate 219 to cause the exclusive-OR gates 211-216 to act as inverters of the associated bits applied to their first inputs.

The 6-bit output of the exclusive-OR gates 211-216 is summed in a second combiner circuit 221 with a second 6-bit number comprised of five "0" bits and the one bit output of NAND gate 219. As a result, this second 6-bit number is either 000000 (zero) or 000001 (one), depending upon whether the carryout bit is a binary "1" or binary "0". A "0" state carry-in bit (or no carry-in) is used by the combiner 221 in summing its two 6-bit inputs together. The output of the combiner 221 is a 6-bit word $c_i$, which is equal to the absolute value of the difference between each of the corresponding components of $x_i$ and $r_i$.

To illustrate the 2's complement arithmetic operation of the comparison function 153A of FIG. 13A, first assume that $x_i = 5$ (or 000101) and $r_i = 3$ (or 000011) at one instant of time. In this case, the addition of 000001 (or 1) to 111100 (the complement of $r_i$, or $\bar{r}_i$) develops 111101 ($\bar{r}_i + 1$); the sum of 000101 ($x_i$) and 111101 ($\bar{r}_i + 1$) in the combiner 201 is 000010 (or 2) with a carryout of 1; and the inversion of the 1 carryout by the NAND gate 219 causes the exclusive-OR gates 211-216 to repeat their 000010 inputs at their outputs and causes 000000 to be added in the combiner 221 to the 000010 output of the gates 211-216 to develop a 6-bit $c_i$ output of 000010 (or 2) at that time.

Now assume that $x_i = 3$ (or 000011) and $r_i = 5$ (or 000101). In this second case, the addition of 000001 (or 1) to 111010 ($\bar{r}_i$) develops 111011 ($\bar{r}_i + 1$); the sum of 000011 ($x_i$) and 111011 ($\bar{r}_i + 1$) in the combiner 201 is 111110 with a carryout of 0; and the inversion of the 0 carryout by the NAND gate 219 causes the exclusive-OR gates 211-216 to invert their 111110 inputs to develop the signal 000001 and causes 000001 to be added in the combiner 221 to the signal 000001 to develop a 6-bit $c_i$ output of 000010 (or 2).

The comparison function circuit 157A of FIG. 13A has the property of requiring that $c_i$, or the differential $|x_i - r_i|$ be small for a good match between $x_i$ and $r_i$, and only a few large differentials can cause a poor match.

The $c_i$ output from the comparison function 153A of FIG. 13A is compared in amplitude with the threshold signal $\theta_i$ in the threshold function modifier 157A that is illustrated in FIG. 14A. The threshold function modifier 157A comprises a comparator 225 which develops a 1-bit binary "1" state $t_i$ signal ($t_i = 1$) whenever the amplitude of $c_i$ is greater than the threshold $\theta_i$. Whenever $c_i$ is equal to or less than the threshold $\theta_i$, a binary "0" state $t_i$ signal ($t_i = 0$) is developed.

As illustrated in the specific weighting function modifier 161A of FIG. 15A, the $t_i$ output from the threshold function modifier 157A of FIG. 14A is multiplied by the 5-bit weighting information $w_i$ in a multiplier 229 to develop a 5-bit $m_i$ output word. The $m_i$ output word from the multiplier 229 is applied to the sum accumulator 165 of FIG. 16.

In FIG. 16, the run gate from FIG. 6 enables an AND gate 233 during the RUN state to pass 1 MHz clock pulses through a 100 nsec. delay circuit 235 to the "clock" input of a shift register 237. It will be recalled (as shown in FIG. 5) that at each 1 MHz clock pulse time a new $m_i$ word is stored in holding register 163 and applied to the sum accumulator 165. Each $m_i$ word from the holding register 163 is summed in a combiner circuit 239 with what has been previously accumulated, and is now at the output of the shift register 237, to develop a new sum. After each new sum has stabilized, a 100 nsec-delayed 1 MHz clock pulse from the delay circuit 235 clocks that new sum into the shift register 237. The register 237 maintains at its output a running sum or total of the $m_i$ words previously generated as a given mask is being read out of the mask storage memory 103 (FIG. 5). This running sum or total of $m_i$ words at the output of the shift register is $d$, where $$d = \sum_{i=1}^{n} m_i,$$

and $i = 1, 2 \ldots n$, and $n =$ the number of words in a given mask. Therefore, it can be seen that each time a new $m_i$ signal is applied to the sum accumulator 165, it is added in the combiner 239 to what has been previously accumulated in the register 237 for the associated mask and developed as a new $d$ value at the output of the sum accumulator 165.

At the end of each mask an EOM bit from the holding register 163 is passed through a 500 nsec. delay circuit 241 to the "clear" input of the shift register 237. This delayed EOM bit clears all of the Q outputs (not shown) of the register 237 to binary "0" states so that the register 237 will be in a cleared condition at the start of the next mask.

The accumulating operation of the sum accumulator 165 will now be described in relation to mask 2. As shown in FIG. 9, mask 2 is 8 STVs long and contains 128 words in those 8 STVs. As a result, a total of 128 $m_i$ words will be generated as mask 2 is being sequentially read out of the mask storage memory 103. Therefore, the shift register 237 can store the sum of those 128 $m_i$ words before a delayed EOM signal from the delay circuit 241 clears the shift register for the subsequent $m_i$ words from mask 3. In the above example, if the sum of 90 $m_i$ words is stored in the register 237, the 91st $m_i$ word is summed with that sum, and, upon being clocked again, the register 237 stores the sum of those 91 $m_i$ words. It can therefore be seen that a new $d$ output, or running total of $m_i$ words, is generated every 10 msec in response to the application of each new $m_i$ word to the combiner 239. Each of these $d$ outputs can be, for example, an 18-bit word. For mask 2 a total of 128 $d$ words or outputs will be generated by the register 237 during each RUN state. However, as will be shown later, only the largest or last one of these 128 $d$ words ($d_2$) will be subsequently used as the mask 2 correlation data signal.

Referring back to FIG. 12, in type #2 the "unweighted absolute value distance function" may be defined as the sum of the $i$ absolute values of the differences between corresponding components of the quantities $x_i$ and $r_i$, where $i = 1, 2 \ldots n$. This second function may be expressed as:

$$d = \sum_{i=1}^{n} |x_i - r_i|,$$

where $i = 1, 2 \ldots n$ and $n =$ the number of words in a given mask.

It can be seen in this type #2 function that the weighting words $w_i$ are each equal to unity and that the threshold $\theta_i$ is not used.

In the implementation of the unweighted absolute value distance function of arithmetic pipeline unit type #2, the specific comparison function 153A of FIG. 13A, the specific threshold function modifier 157C of FIG. 14C, the specific weighting function modifier 161B of FIG. 15B and the sum accumulator 165 of FIG. 16 can be utilized. The comparison function 153A of FIG. 13A and the sum accumulator 165 of FIG. 16 have been previously discussed. FIG. 14C indicates that the threshold function modifier 157C is a straight lead 245. As a result, the threshold $\theta$ is not utilized in the threshold function modifier 157C of FIG. 14C and $t_i = c_i$. The weighting function modifier 161B of FIG. 15B illustrates a straight lead 247 to show that the weight $w_i$ assigned to each component or dimension of the signal $t_i$ is unity. Therefore $m_i = t_i = c_i$ and each of the $m_i$ and $t_i$ words is a 6-bit word, since each value of $c_i$ is a 6-bit word.

For the specific implementation of the type #2 unweighted absolute value distance function, the arithmetic pipeline unit 151 of FIG. 5 can be simplified by deleting the holding register 155, 159 and 163 and the threshold and weighting function modifiers 157 and 161, and by applying the $c_i$ word (from the comparison function 153A of FIG. 13A) and the EOM bit (from the mask storage memory 103) directly to the sum accumulator 165, and also by respectively applying the EOM and EOR bits (from the mask storage memory 103) to the remaining places indicated in FIG. 5.

Referring back to FIG. 12, in type #3 the "weighted absolute value distance function" may be defined as the sum of the $i$ weighted ($w_i$) absolute values of the differences between corresponding components of the quantities $x_i$ and $r_i$, where $i = 1, 2 \ldots n$. This third function may be expressed as:

$$d = \sum_{i=1}^{n} w_i |x_i - r_i|,$$

where $i = 1, 2 \ldots n$ and $n =$ the number of words in a given mask.

It can be seen in this type #3 function that the threshold words $\theta_i$ are not utilized.

In the implementation of the weighted absolute distance function of arithmetic pipeline unit type #3, the specific comparison function 153A of FIG. 13A, the specific threshold function modifier 157C of FIG. 14C, the specific weighting function modifier 161A of FIG. 15A and the sum accumulator 165 of FIG. 16 can be utilized. All of these circuits have been previously discussed and therefore require no further discussion. However, as indicated in FIG. 12, the bit lengths for the $c$, $t$, $m_i$ and $d$ words in type #3 are 6, 6, 11 and 18, respectively. It should be noted that type #3 differs from type #1 in that no threshold $\theta$ is employed. As a result, for specifically implementing this type #3, the arithmetic pipeline unit 151 of FIG. 5 can be simplified by deleting the threshold function modifier 157 and the holding register 159, and by applying the $c_i$ and $w_i$ words from the holding register 155 directly to the weighting function modifier 161 (since $t_i = c_i$ and $w_i = w_i$) and the EOM and EOR words from the holding register 155 directly to the holding register 163.

Referring back to FIG. 12, in type #4 the "Euclidean distance squared function" may be defined as the sum of the squares of the $i$ differences between corresponding components of the quantities $x_i$ and $r_i$, where $i = 1, 2 \ldots n$. This fourth function may be expressed as:

$$d = \sum_{i=1}^{n} (x_i - r_i)^2$$

where $i = 1, 2 \ldots n$ and $n$ = the number of words in a given mask.

It can be seen that in this type #4 function each of the weighting words $w_i$ are equal to unity and that no threshold $\theta_i$ words are utilized.

In the implementation of the Euclidean distance squared function of arithmetic pipeline unit type #4, the specific comparison function 153A of FIG. 13A, the specific threshold function modifier 157B of FIG. 14B, the specific weighting function modifier 161B of FIG. 15B and the sum accumulator 165 of FIG. 16 can be utilized. Only the threshold function modifier 157B of FIG. 14B will now be discussed in detail, since the remaining ones of the above-identified circuits have been previously discussed.

The threshold function modifier 157B of FIG. 14B comprises a squaring or multiplier circuit 249 which, while not utilizing the threshold $\theta_i$, squares the 6-bit $c_i$ input by multiplying it by itself to develop a 12-bit $t_i$ output which is equal to $c_i c_i$ or $c_i^2$. As indicated in FIG. 12, the bit lengths for the $m_i$ and $d$ words in type #4 are 12 and 18, respectively.

For the specific implementation of the type #4 Euclidean distance squared function, the arithmetic pipeline unit 151 of FIG. 5 can be simplified by deleting the weighting function modifier 161 and holding register 163, by directly applying the $t_i$ word and EOM bit from the holding register 159 directly to the sum accumulator 165, and by also applying the EOM and EOR bits from the holding register 159 to the remaining places indicated in FIG. 5.

Referring back to FIG. 12, in type #5, the "dot product of two vectors function" may be defined as the sum of the $i$ products of corresponding components of the quantities $x_i$ and $r_i$ where $i = 1, 2 \ldots n$. This fifth function may be expressed as:

$$d = \sum_{i=1}^{n} x_i r_i,$$

where $i = 1, 2 \ldots n$ and $n$ = the number of words in a given mask.

It can be seen in this type #5 function that the weighting words $w_i$ are each equal to unity and that none of the threshold words $\theta_i$ are used.

In the implementation of the dot product of two vectors function of arithmetic pipeline unit type #5, the specific comparison function 153B of FIG. 13B, the specific threshold function modifier 157C of FIG. 14C, the specific weighting function modifier 161B of FIG. 15B and the sum accumulator 165 of FIG. 16 can be utilized. Only the comparison function 153B of FIG. 13B will be discussed in detail, since the rest of the above-identified circuits have been previously discussed. The comparison function 153B of FIG. 13B comprises a multiplier 251 which multiplies corresponding components of the $x_i$ and $r_i$ words together to develop a 12-bit $c_i$ word. Here $c_i$ is equal to the product $x_i r_i$. As indicated in FIG. 12, the bit lengths for each of the $t_i$, $m_i$ and $d$ words in type #5 are 12, 12 and 18 respectively.

For the specific implementation of the type #5 dot product of two vectors function, the arithmetic pipeline unit 151 of FIG. 5 can be simplified by deleting the holding registers 155, 159 and 163 and the threshold and weighting function modifiers 157 and 161, and by applying the $c_i$ word (from the comparison function 153B of FIG. 13B) and the EOM bit (from the mask storage memory 103) directly to the sum accumulator 165, and also by respectively applying the EOM and EOR bits (from the mask storage memory 103) to the remaining places indicated in FIG. 5.

Figure 17:
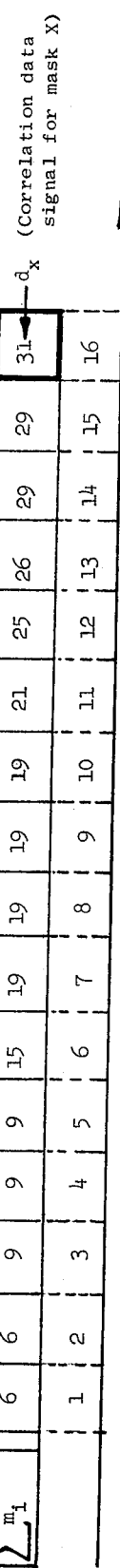
FIG. 17 illustrates the type #1 arithmetic pipeline unit 151 operation for a 16-word length mask X.

The correlation operation of the arithmetic pipeline unit 151 will now be further analyzed. more specifically, the correlation operation of the type #1 unit 151 (FIG. 12) in conjunction with, for example, a 16-word length mask X will be analyzed by referring to FIG. 17, since that type #1 unit utilizes both thresholds $\theta_i$ and weights $w_i$. However, it should be noted that, from the information given, a similar analysis can be readily made by those skilled in the art for the other types of arithmetic pipeline units 151 (FIG. 12).

Assume, as shown in FIG. 17, that $x_i$, $r_i$, $\theta_i$ and $w_i$ develop their respectively indicated values during the 16 consecutive periods of 1 MHz count pulses (from the central control 87) for the 16-word length mask X. In this 16 word length mask, $i = 1, 2 \ldots 16$. It can be seen that each of the $c_i$ words (from the comparison function 153A of FIG. 13A) is equal to the absolute value of the differences between the corresponding $x_i$ and $r_i$ words. Whenever the values of these $c_i$ words exceed the corresponding threshold values $\theta_i$, the $t_i$ words (from the threshold function modifier 157A of FIG. 14A) are equal to a value of 1. For all other values of $c_i$ and $\theta_i$, the values of the $t_i$ words are 0. The multiplications of corresponding values of the $t_i$ and $w_i$ words develop the $m_i$ words (from the weighting function modifier 161A of FIG. 15A). Whenever a $t_i$ word is equal to 1 the associated resulting $m_i$ word is equal in value to the associated weighting word $w_i$. Whenever a $t_i$ word is equal to 0, the associated resulting $m_i$ word is equal to 0. The summation or running total of the value of the previously accumulated $m_i$ words with the value of the newest $m_i$ word is shown, with the final sum at the output of the sum accumulator 165 of FIG. 16 having a value of 31 during the final or sixteenth count pulse period for mask X. It is this final sum of 31 that is the output correlation data signal $d_x$ for mask X.

Referring back to FIG. 5, the $d$'s from the sum accumulator 165 in the arithmetic pipeline unit 151 are applied via a composite line 301 to the "data in" input of a first-in, first-out (FIFO) data storage circuit 303. The FIFO data storage circuit 303 can be comprised of an array of eighteen parallel-operated FIFO shift registers (not shown), each of which can be of the type manufactured by Fairchild and have the Fairchild part number A7K3341191. Each FIFO shift register in the circuit 303 has "data in", "strobe in" and "strobe out" inputs and a "data out" output.

The 18 bits in each of the $d$'s developed by the sum accumulator 165 are applied to respective "data in" inputs of the 18 FIFO shift registers in the circuit 303. All of the eighteen "strobe in" inputs are connected together for commonly receiving each EOM bit from the holding register 163. By this means each EOM bit enables the eighteen FIFO shift registers to accept only the 18 bits in the last $d$ word developed before the EOM bit is received. It can therefore be seen that only the 18 bits in one $d$ word are respectively shifted into the circuit 303 for each mask that is being read out of the mask storage memory 103. The $d$ word that is stored in the circuit 303 for each mask is the largest and hence last accumulated sum developed in the sum accumulator 165 before the accumulator 165 is cleared by the delayed EOM bit from the delay circut 167. The array of FIFO shift registers in the circuit 303 internally shifts in parallel the 18 bits in each received $d$ word down to the first empty location. This enables the circuit 303 to sequentially store a d word for each of the masks being read out of the mask storage memory 103 during the RUN state.

Figure 18:
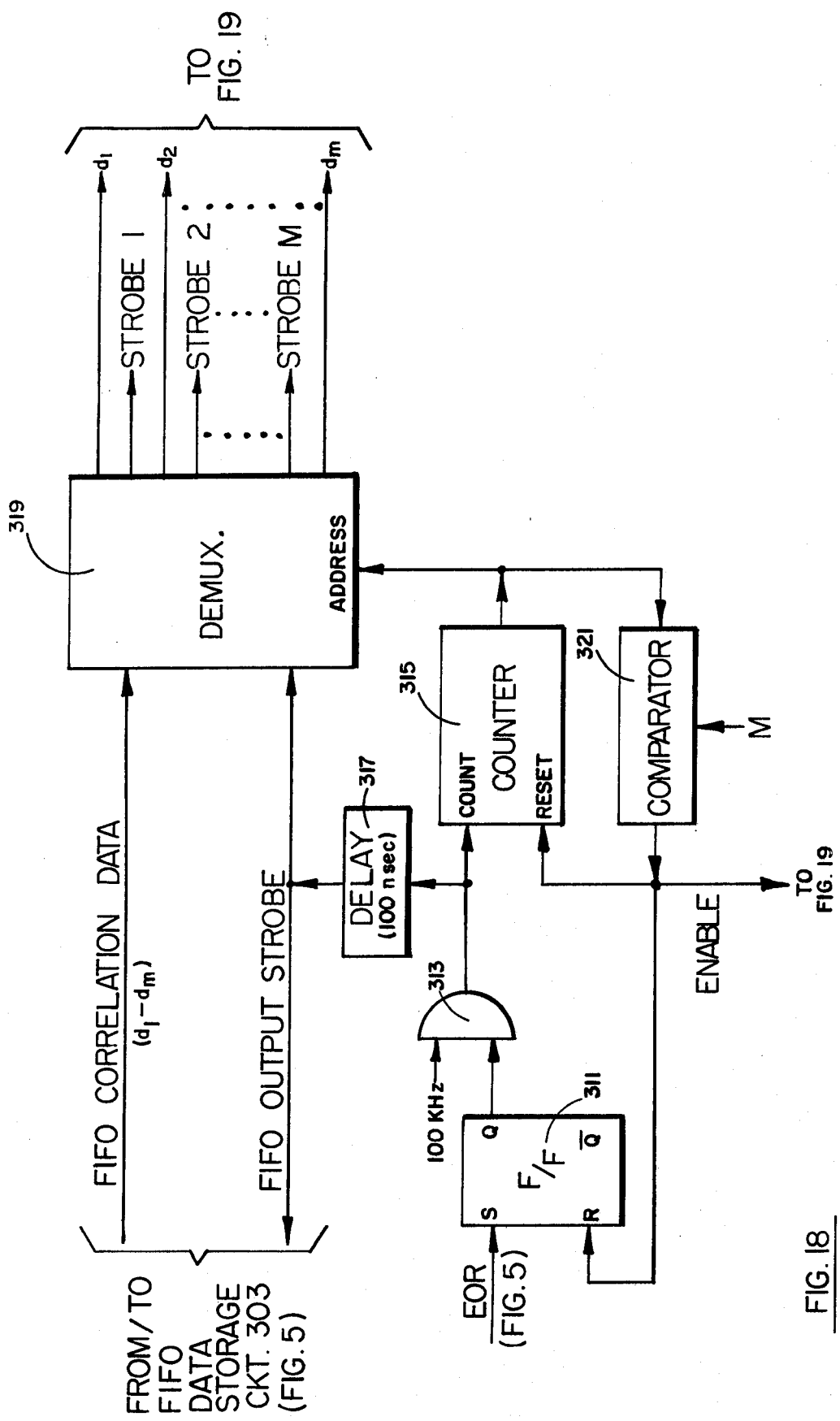
FIG. 18 is a block diagram of a first part of the decision function of FIG. 1.
Figure 19:
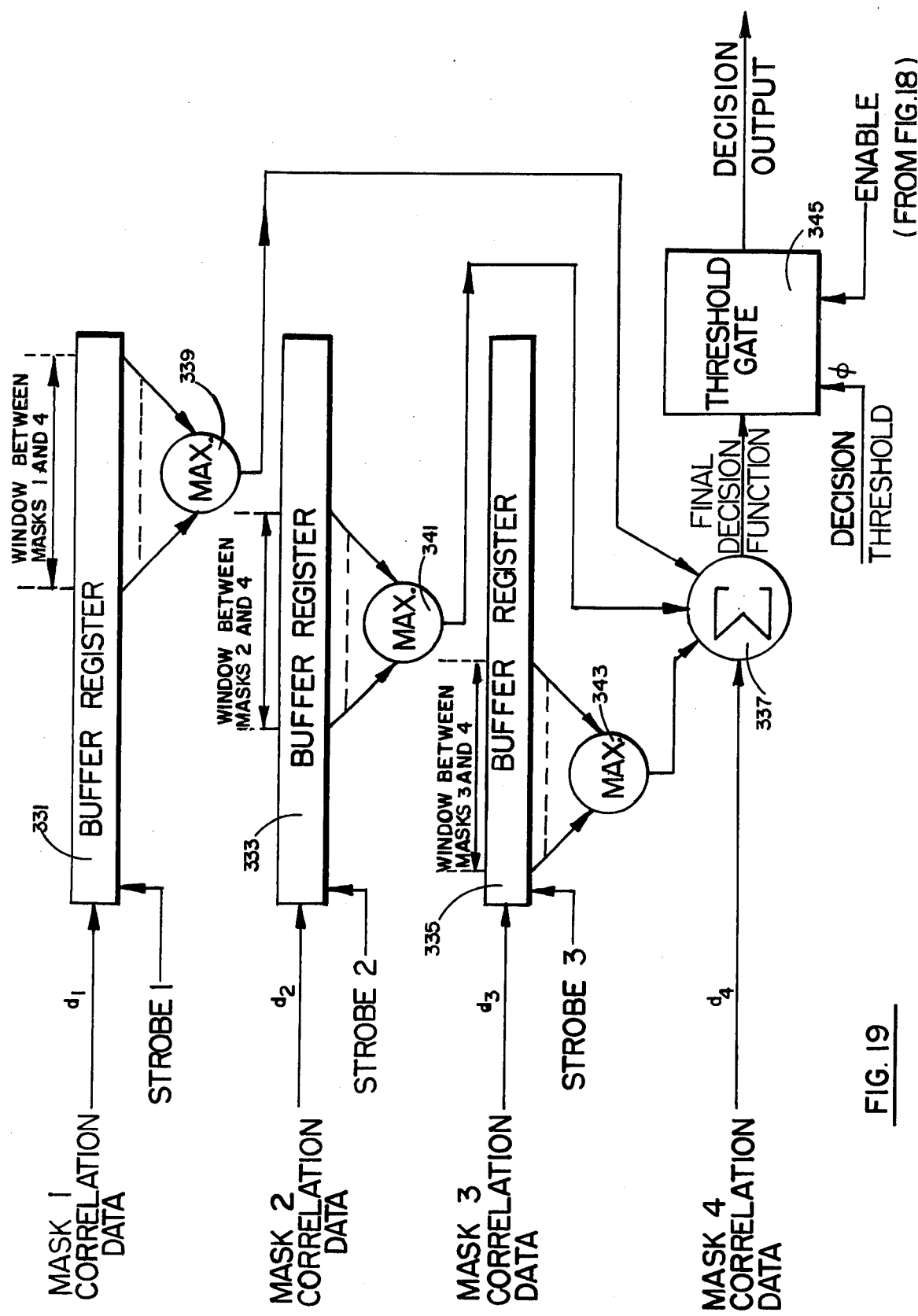
FIG. 19 is a block diagram of a second part of the decision function of FIG. 1.

As will shortly be explained in more detail in relation to FIGS. 18 and 19, the EOR (end-of-run) bit from the holding register 163 is applied to the decision function 17. In response to each EOR bit, thw decision function 17 generates a serial sequence of FIFO output strobe pulses. All of the "strobe out" outputs of the circuit 303 are connected together for commonly receiving each of the FIFO output strobe pulses. In this manner each of the sequence of FIFO output strobe pulses commands all of the 18 FIFO shift registers to collectively read out an associated 18-bit correlation data word $d$ for an associated mask that had previously been read out of the mask storage memory 103. Since, as indicated in FIG. 9, there are M different masks stored in the mask storage memory 103, there are M different correlation data words $(d_1, d_2 \ldots d_m)$ that are sequentially read out of the FIFO circuit 303. The sequence of correlation data words are applied to the decision function 17. The operation of the decision function 17 will now be more fully explained by referring to FIGS. 18 and 19.

FIG. 18 discloses a first portion of the decision function 17. In operation, the EOR bit from the holding register 163 (FIG. 5) sets a flip flop 311 to cause its Q output to change to a "1" state signal. This "1" state signal enables an AND gate 313 to pass 100 KHz clock pulses (from the system timing generator 19 of FIG. 1) to the "count" input of a counter 315 and to a 100 nsec delay circuit 317.

Each of the 100 KHz pulses from the AND gate 313 is counted by the counter 315 to develop and apply an address count to the "address" input of a demultiplexer 319. Each of the 100 KHz pulses that is being counted by the counter 315 is also delayed 100 nsec by the delay circuit 317 to develop a FIFO output strobe pulse. Therefore, the output of the delay circuit 317 is the sequence of FIFO output strobe pulses which enable the FIFO data storage circuit 303 (FIG. 5) to sequentially read out and apply the 18-bit wide FIFO correlation data signals $d_1 - d_m$ to the demultiplexer 319.

Each address count from the counter 315 is in a stabilized condition before the association one of the $d_1 - d_m$ data signals is applied to the demultiplexer 319. The FIFO output strobe pulses from the delay circuit 317 are also applied to the demultiplexer 319. The demultiplexer 319 may be a set of electronic switches which are sequentially addressed by the addresses from the counter 315 to convert the serially-developed $d_1 - d_m$ input data signals into parallel $d_1 - d_m$ outputs. At the same time, the demultiplexer 319 converts the serial sequence of FIFO output strobe pulses from the delay circuit 317 into parallel output strobe signals, strobe$_1$ – strobe$_m$.

Each output address count from the counter 315 is applied to one input of a comparator 321. The number M, which is equal to the number of masks stored in the mask storage memory 103 (FIG. 5) is applied to a second input of the comparator 321. When the address count from the counter 315 is equal to the number M, the comparator 321 develops an enable pulse which resets the flip flop 311 to prevent any more 100 KHz pulses from being passed by the AND gate 313. The enable pulse also resets the counter 315 to a 0 count. The flip flop 311 and counter 315 remain in their reset conditions until the following EOR bit enables new FIFO correlation data signals to be demultiplexed. The mask correlation data signals $d_1 - d_m$, the strobe$_1$ – strobe$_m$ signals and the enable pulse are applied to a second portion of the decision function 17, which is illustrated in FIG. 19.

In FIG. 19 the second part of the decision function 17 is shown for a four-mask case, where M = 4. However it should be realized that the implementation shown could readily be expanded to, for example, a 27-mask case (where M = 27). To correlate more than 27 masks within one sampling period, a preselected number of the asynchronous correlation circuits 15 (FIG. 5) could be operated in parallel to simultaneously produce a similar number of parallel streams of output correlation data. However, if only one asynchronous correlation circuit 15 were used (as illustrated in FIG. 1,) more than 27 masks could be correlated within one sampling period by basically decreasing the time required for each mask correlation within the chosen sampling period. In this latter case, to expand the system of the invention to, for example, at least a 500-mask case, the following modifications could be made: present state-of-the-art, faster memories could be used for the RAM 81 and mask storage memory 103; the word-storage capacity of the mask storage memory 103 could be expanded to, for example, 131,072 words; a 10 MHz clock (instead of the illustrated 1 MHz clock) could be used to read out the words from the RAM 81 and memory 103 and to perform the other timing operations in the system; and a sampling time of 20 msec (instead of 10 msec) could be used in the system by utilizing a sampling frequency of 50 Hz instead of the illustrated 100 Hz). Of course, a combination of these two cases could also be used to increase the number of mask correlations within a sampling period. It can therefore be seen that, by any of the above recited means, the system of the invention could be readily implemented to use any other desired number of masks.

It will be recalled that the words in each mask in the mask storage memory 103 are continuously compared with associated STVs, or digitized spectral parameters, stored in the RAM 81 (FIG. 5); that a correlation data signal $d$ is the sum of these comparisons for an associated mask; that a correlation data signal $(d_1 - d_m)$ is generated for each of the masks 1 – M in the memory 103; and that the relative amplitude of each of these $d_1 - d_m$ signals represents a measurement of the closeness or resemblance between the associated mask in the memory 103 and the speech stored in the RAM 81.

As described previously, the masks in the mask storage memory 103 (FIG. 5) each represent a dyad or triad phonetic sound. Assume, for the four mask case illustrated in FIG. 19, that the keyword "Los Angeles" is desired to be detected. Phonetically the keyword "Los Angeles" can be broken down to the sound groups "Los", "An" "ge" and "les". For purposes of the following discussion, let the masks 1–4 respectively represent the sound groups "Los", "An", "ge" and "les".

During each 10 msec period new mask correlation data signals $d_1$, $d_2$, $d_3$ and $d_4$ are generated and respectively applied by way of composite lines to buffer registers 331, 333 and 335 and to a combiner circuit 337. Every 10 msec the strobes 1–3 enable the registers 331, 333 and 335 to respectively shift in and store the newest values of $d_1$, $d_2$ and $d_3$. The buffer registers 331, 333 and 335 can each comprise 18 parallel shift registers (not shown) with each shift register containing 128 sequentially coupled flip-flops (not shown). Therefore, each of the buffer registers 331, 333 and 335 can contain 128 consecutive different values for the associated $d$ at any given time. For example, the buffer register 331 contains 128 consecutive values of the mask 1 correlation signal $d_1$. Since a different value of $d_1$ is generated every 10 msec, the register 331 (as well as each of the registers 333 and 335) is 1280 msec long.

Associated with the buffer registers 331, 333 and 335 are windows of observation which are respectively time-positioned with respect to each other within the associated registers 331, 333 and 335 according to the relative times of occurrence of the phonetic sounds in the desired keyword, which in this example is "Los Angeles". For example, since the sound "Los " occurs before the sound "An", the window in the register 331 is located to the right of the window in the register 333. In a like manner, since the sound "An" occurs before the sound "ge", the window in the register 333 is located to the right of the window in the register 335. Since the sound "les" occurs last in the word "Los Angeles", it is applied directly to the combiner 337.

Each of the windows of observation in the registers 331, 333 and 335 may be between 30 and 200 msec in length. The length or time duration of a window of observation is basically determined by the amount of variations in the rate of speech for the associated dyad or triad. The more variations in the rate of speech, the longer the window. On the other hand, the boundaries of a window (or closeness of the windows to each other) are determined from the training set of utterances. One boundary of the window is determined by the closest in time that the mask and the following adjacent mask are ever observed together, while the other boundary is determined by the furthest away in time that they are ever observed apart.

In determining the length and boundaries of the windows of observation for a desired keyword, the person who trains the trainer 105 (FIG. 5) examines all of the training data to be used and statistically measures the ranges of each of the time variances or variations of the associated masks with respect to each other. Each window is derived from the training data by observing the range or extremes of the variations in time of the rates of speech for the associated dyad or triad sound in each desired keyword and adding an additional 20% of the range to each end. Each window is thus the empirical range of these variations expanded to permit limited additional deviation found in the training data.

Each of the windows in FIG. 19 are referenced to the last mask. As seen in FIG. 19 for the four mask case, each of the windows for the buffer registers 331, 333 and 335 are referenced to mask 4 or more specifically to the current mask 4 correlation data signal $d_4$. The further away the window in a buffer register is from the current $d_4$ value for the last mask (mask 4), the wider the window of observation. For example, in the buffer register 331, the window between masks 1 and 4 is the widest, because it is furtherest away in time from the current $d_4$ value. On the other hand, in the buffer register 335, the window between masks 3 and 4 is the narrowest, because it is closest in time from the current $d_4$ value.

The windows in the buffer registers 331, 333 and 335 are stationary as the correlation values $d_1 - d_3$ are being shifted through the buffers. The various $d$ values (of $d_1$, $d_2$ and $d_3$) contained in the windows of the buffer registers 331, 333 and 335 are respectively applied to maximum or peak detectors 339, 341 and 343. Each peak detector detects the maximum $d$ value within its associated window. The best match between a mask and the spectrographic signal stored in the RAM 81 is indicated by this peak value, which indicates a close correlation between that mask with its associated part of a desired keyword. As indicated before, the proper width and positioning of the windows with respect to each other enables the proper peaks for the associated components of a desired keyword to be simultaneously developed when that desired keyword is present. The current value of $d_4$, along with the maximum values of $d_1$, $d_2$ and $d_3$ that are developed within their respective windows are summed together in the combiner circuit 337 to develop a final decision function signal. It can be seen that in this illustration the final decision function signal is the summation of the present correlation value for the last mask (mask 4) and the maximum values, looking back in time, contained in the windows of the previous masks. Every 10 msec a new value of the final decision function is computed.

The amplitude of each final decision function signal is indicative as to whether or not a desired keyword is contained in the speech being analyzed. To determine whether or not the desired keyword is present, each final decision function signal, and a decision threshold signal $\phi$, are applied to a threshold gate 345. The decision threshold signal $\phi$ is empirically derived in training the trainer 105 (FIG. 5). Upon the application of the enable signal from the comparator 321 (FIG. 18) the threshold gate 345 develops a decision output signal. The decision output is a "1" state signal whenever the final decision function signal is larger than the decision threshold $\phi$, and a "0" state output otherwise. Every 10 msec a new value of decision output is computed by comparing a newly developed final decision function with the decision threshold $\phi$. A "1" state decision output from the threshold gate 345 indicates that the correlation values of the speech input and the masks that make up that keyword have been detected in the right order and with the proper peak values, and that therefore the desired keyword has been detected. This "1" state decision output could be utilized by an output circuit (not shown) to ring a bell, turn a light on, enable some control equipment to perform some preselected function, such as the initiation or termination of the operation of some other equipment (not shown). Due to the locations and widths of the windows in the circuit of FIG. 19, the mask correlations can be combined in a manner that allows for a wide variation in rates of speech.

It should be noted that the circuit of FIG. 19 can just detect one given keyword. Where additional keywords are desired to be detected, an additional circuit similar to that known in FIG. 19 is required for each additional keyword to be detected. In this event the proper ones of the correlation data signals $d_1 - d_m$ would have to be utilized with each additional keyword to be selected, with one buffer register being associated with all but the last mask of the mask group associated with any given keyword, and with the windows in the buffer registers being properly positioned and having the proper widths. By continuously combining the mask correlation data from the demultiplexer 319 (FIG. 18) in a selective mannerr, as indicated above, any given number of keywords could be detected by the resultant system.

Where, for example, three multiple masks are used because of free variation and interspeaker effect (discussed previously) each of the three masks could be correlated in series (or even in parallel) with the output of the RAM 81. The correlation data signals from these three multiple masks could then be simultaneously applied to a maximum or peak detector (not shown) similar to the peak detectors 339, 341 and 343, with the maximum mask correlation value $d$ of the three being applied as, for example, one of the $d$'s to the circuitry of FIG. 19. By using multiple masks, the system of the invention is not only able to accept a large number of different speakers but also able to accept broad free variation in the phonetic transcription of the keyword being detected.

Figure 20:
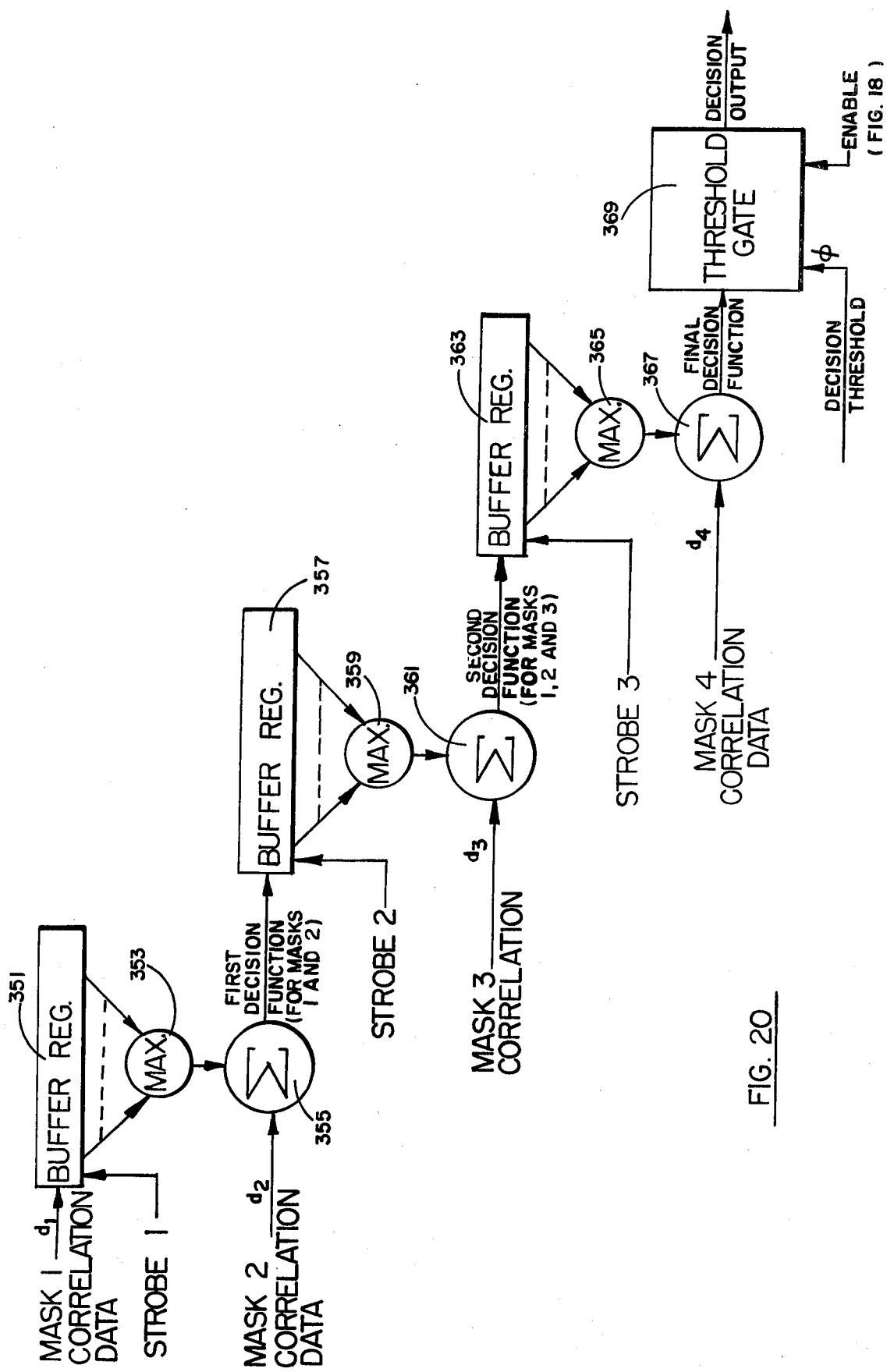
FIG. 20 is a block diagram of an alternate second part of the decision function of FIG. 1 which may be utilized in lieu of the structure of FIG. 19.

FIG. 20 discloses a block diagram of an alternate second part of the decision function 17 of FIG. 1 which may be utilized in lieu of the structure of FIG. 19. The circuit illustrated in FIG. 20, like that in FIG. 19, deals with an exemplary four-mask case. It should be obvious that the circuit of FIG. 20 could readily be expanded to utilize more masks in conformance with the teaching herein presented. Also the circuit of FIG. 20, like that of FIG. 19, only has the capability of detecting one keyword. To enable the system of the invention to have the capability of detecting any given number of keywords, a corresponding number of circuits similar to FIG. 20 would have to be implemented into the system.

It will be recalled that in the circuit of FIG. 19, the windows of the buffer registers 331, 333 and 335 were referenced to the current mask correlation data ($d_4$) that was derived from the last mask (mask 4 in the illustrated example). In the circuit of FIG. 20 each window is referenced to the correlation data developed from the following adjacent mask rather than to that of the last mask.

In FIG. 20 the mask 1 correlation data signals $d_1$ are consecutively strobed into a buffer register 351 every 10 msec by the associated strobe 1 signals. The register 351 has a window of observation which substantially encompasses the whole storage capacity of the register 351. Every 10 msec a maximum detector 353 selects the peak $d_1$ value from the window of observation of the register 351. Each peak $d_1$ output from the maximum detector 353 is summed with an associated mask 2 correlation data signal $d_2$ in a combiner circuit 355 to develop a first decision function signal for masks 1 and 2. Every 10 msec a new first decision function is developed.

Consecutively developed first decision function signals from the combiner 355 are strobed into a buffer register 357 by associated strobe 2 signals. Like register 351, the register 357 has a window of observation which substantially encompasses the whole storage capacity of the register 357. Every 10 msec a maximum detector 359 selects the peak value of the first decision function signals stored within the window of observation in the register 357. Each peak first decision function from the maximum detector 359 is summed with an associated mask 3 correlation data signal $d_3$ in a combiner circuit 361 to develop a second decision function signal for masks 1, 2 and 3. Every 10 msec a new second decision function is developed.

Consecutively developed second decision function signals from the combiner 361 are strobed into a buffer register 363 by associated strobe 3 signals. Like registers 351 and 357, the buffer register 363 has a window of observation which substantially encompasses the whole storage capacity of the register 363. It can therefore be seen that, while the registers 351, 357 and 363 of FIG. 20 are similar to the registers 331, 333 and 335 of FIG. 19, they are much shorter in length or storage capacity than the registers of FIG. 19.

Every 10 msec a maximum detector 365 selects the peak value of the second decision function signals stored within the window of observation in the register 363. Each peak second decision function from the maximum detector 365 is summed with an associated mask 4 correlation data signal $d_4$ in a combiner circuit 367 to develop a third decision function signal for masks 1, 2, 3 and 4. Since only a four-mask case is illustrated in FIG. 20, this third decision function signal is the final decision function signal. It can therefore be seen that the circuit of FIG. 20 locates the maximum discriminant value or decision function over the time window between two adjacent masks and adds this value to the discriminant function of the following mask, etc. In this manner the final decision function is sequentially accumulated in the circuit of FIG. 20, rather than at the end like in FIG. 19.

The final decision function from the combiner 367 is compared with the empirically-derived decision threshold $\phi$ in a threshold gate 369 to develop a decision output signal each time that the enable signal from the comparator 321 is applied to the gate 369. A "1" state decision output indicates that a preselected keyword has occurred or been detected, while a "0" state decision output indicates the converse. A "1" state decision output signal can be used to perform any of the functions specified in regard to FIG. 19. As mentioned before, whenever additional keywords are desired to be detected by the system, an additional circuit of FIG. 20 would be required to be implemented into the system for each additional keyword.

Since the implementation of FIG. 20 references each of the windows in the buffer registers 351, 357 and 363 with respect to the following adjacent mask, rather than to the last mask as is done in FIG. 19, the implementation of FIG. 20 offers several advantages over the implementation shown in FIG. 19.

First, each of the buffers 351, 357 and 363 in FIG. 20 are relatively short in length, since each window substantially encompasses the entire storage capacity of the associated register. On the other hand, the circuit of FIG. 19 requires a relatively large storage capacity for each of the registers 331, 333 and 335, since each window only utilizes a relatively small part of the storage capacity of its associated one of the registers 331, 333 and 335. In other words, less buffer storage capacity is required in FIG. 20 than in FIG. 19, since the storage required in FIG. 20 is only the maximum occurrence time between adjacent masks, rather than the maximum time between the first and last masks of FIG. 19. Therefore, a smaller amount of hardware is needed for the circuit of FIG. 20 than that of FIG. 19.

Second, the windows of the registers in FIG. 20 are each of the same length and narrower than those of the registers of FIG. 19. In FIG. 19 the windows have to be made longer and longer as the registers are referenced further and further away from the last mask. As shown in FIG. 19, the register 331 required a longer window than the register 333, which in turn required a longer window than the register 335. This is due to the fact that the variance of time occurrence is greater the more distant in time a window is from the correlation data from the last mask. In FIG. 20, the variation within a word is measured, whereas in FIG. 19 the variation all across the word is measured. The variation of mask 1 with respect to mask 2 is much less than the variation of mask 1 with respect to the last mask. Consequently, the circuit of FIG. 20 can accept the same range of words as that of FIG. 19, but with much narrower windows.

Third, the circuit of FIG. 20 is more accurate than that of FIG. 19 since the windows in FIG. 20 are narrower than those in FIG. 19. The windows of FIG. 19 must be longer to capture the required information. The wider that a window is, the more values are stored within. Consequently, there is more chance of a false keyword detection occurring by picking the wrong value. Conversely, by utilizing smaller windows in FIG. 20, more accurately describing the temporal relationships within the keyword utterance, the false alarm probability is reduced.

The invention thus provides a system for asynchronously detecting one or more keywords in continuous speech wherein the input speech is changed into a plurality of analog speech parameters by a speech processor, the analog speech parameters are selectively converted into digitized spectral parameters or STVs by an STV generator, sequences of the digitized spectral parameters are continuously correlated in an asynchronous correlation circuit with subelements of one or more desired keywords in order to develop correlation data, and the correlation data selectively enables a decision function circuit to develop a preselected decision output signal for each preselected keyword that is detected.

While the salient features of the invention have been illustrated and described, it should be readily apparent to those skilled in the art that many changes and modifications can be made in the system of the invention presented without departing from the spirit and scope of the invention. For example, the system of FIG. 1 could be implemented with different logic circuits and timing signals, operated with serial data instead of parallel data or vice-versa, and/or modified, as previously described, to utilize any selected number of masks in either a limited or unlimited keyword detection operation. It is therefore intended to cover all such changes and modifications of the invention that fall within the spirit and scope of the invention as set forth in the appended claims.

What is claimed is:

1. A system for asynchronously detecting one or more keywords in continuous speech, said system comprising:
   processor means responsive to a continuous speech signal for continuously developing a plurality of spectral estimates therefrom;
   generator means responsive to the plurality of spectral estimates for periodically generating digitized spectral parameters therefrom;
   first memory means for prestoring predetermined ones of dyad and triad subelement signals associated with one or more preselected keywords;
   correlation means for asynchronously correlating each of the prestored dyad and triad subelement signals of one or more preselected keywords with continuous sequences of the digitized spectral parameters to asynchronously produce a plurality of continuous correlation data signals; and
   a decision means for each desired keyword, each of said decision means being responsive to associated ones of the correlation data signals for developing an occurrence decision output whenever an associated keyword has been detected.

2. The system of claim 1 wherein said processor means comprises:
   input means for separating the continuous speech signal into a plurality of preselected frequency components; and
   parameter means responsive to the plurality of preselected frequency components for developing the plurality of spectral estimates.

3. The system of claim 2 wherein said parameter means comprises:
   first means responsive to the plurality of preselected frequency components for producing a plurality of associated detected signals; and
   second means responsive to the plurality of associated detected signals for developing the plurality of spectral estimates.

4. The system of claim 2 wherein said generator means comprises:
   means responsive to the plurality of spectral estimates for developing time division multiplexed spectral estimates; and
   conversion means for developing the digitized spectral parameters in response to the time division multiplexed spectral estimates.

5. The system of claim 4 wherein said correlation means comprises:
   second memory means for storing the digitized spectral parameters during a first mode of operation and for sequentially reading out sequences of digitized spectral parameters during a second mode of operation; and
   means for sequentially and asynchronously correlating each of the prestored dyad and triad subelement signals during the second mode of operation with a correspondingly long sequence of digitized spectral parameters to asynchronously develop a corresponding correlation data signal for each prestored subelement signal, the amplitude of each correlation data signal being indicative of the closeness of match between its associated prestored subelement signal and the corresponding sequence of digitized spectral parameters.

6. The system of claim 5 wherein each said decision means comprises:

a plurality of storage means for storing respective sequences of predetermined ones of the correlation data signals, each of said storage means having an associated window encompassing a preselected sequence of previously stored correlation data signals associated with that said storage means;

a plurality of maximum detectors respectively coupled to said windows of said plurality of storage means for respectively developing the peak values of signals within said windows;

a combiner for combining another predetermined one of the correlation data signals with the peak values of signals from said plurality of maximum detectors to develop a final decision function; and a threshold gate for developing an occurrence decision output whenever the amplitude of the final decision function exceeds that of a decision threshold signal, said occurrence decision output being indicative of the detection of the keyword associated with said decision means.

7. The system of claim 4 wherein each said decision means comprises:

a plurality of storage means for storing respective sequences of predetermined ones of the correlation data signals, each of said storage means having an associated window encompassing a preselected sequence of previously stored correlation data signals associated with that said storage means;

a plurality of maximum detectors respectively coupled to said windows of said plurality of storage means for respectively developing the peak values of signals within said windows;

a combiner for combining another predetermined one of the correlation data signals with the peak values of signals from said plurality of maximum detectors to develop a final decision function; and a threshold gate for developing an occurrence decision output whenever the amplitude of the final decision function exceeds that of a decision threshold signal said occurrence decision output being indicative of the detection of the keyword associated with said decision means.

8. The system of claim 4 wherein said decision means comprises:

a preselected number N of sequentially coupled signal units, each of said signal units comprising:
  a storage circuit for storing a sequence of signals, said storage circuit having a window substantially encompassing its total signal storage capacity;
  a maximum detector coupled to said window of said storage circuit for detecting the peak value of the signals stored within said window; and
  a combiner for developing a summed output signal by summing the peak value from said maximum detector with a preselected one of the correlation data signals; and a threshold gate, the first one of said sequentially coupled signal units storing a sequence of a first preselected one of the correlation data signals, a sequence of the summed output signals of each said combiner in the first N-1 combiners being applied to and stored in said storage circuit in the following one of said signal units, a sequence of the summed output signals of the Nth one of said combiners being applied to said threshold gate, said threshold gate generating an occurrence decision output whenever the amplitude of a summed output signal from the Nth one of said combiners exceeds that of a decision threshold signal, said occurrence decision output being indicative of the detection of the keyword associated with said decision means.

9. The system of claim 8 wherein said correlation means comprises:

second memory means for storing the digitized spectral parameters during a first mode of operation and for sequentially reading out sequences of digitized spectral parameters during a second mode of operation; and means for sequentially and asynchronously correlating each of the prestored dyad and triad subelement signals during the second mode of operation with a correspondingly long sequence of digitized spectral parameters to asynchronously develop a corresponding correlation data signal for each prestored subelement signal, the amplitude of each correlation data signal being indicative of the closeness of match between its associated prestored subelement signal and the corresponding sequence of digitized spectral parameters.

10. The system of claim 2 wherein said correlation means comprises:

second memory means for storing the digitized spectral parameters during a first mode of operation and for sequentially reading out sequences of digitized spectral parameters during a second mode of operation; and means for sequentially and asynchronously correlating each of the prestored dyad and triad subelement signals during the second mode of operation with a correspondingly long sequence of digitized spectral parameters to asynchronously develop a corresponding correlation data signal for each prestored subelement signal, the amplitude of each correlation data signal being indicative of the closeness of match between its associated prestored subelement signal and the corresponding sequence of digitized spectral parameters.

11. The system of claim 10 wherein each said decision means comprises:

a plurality of storage means for storing respective sequences of predetermined ones of the correlation data signals, each of said storage means having an associated window encompassing a preselected sequence of previously stored correlation data signals associated with that said storage means;

a plurality of maximum detectors respectively coupled to said windows of said plurality of storage means for respectively developing the peak values of signals within said windows;

a combiner for combining another predetermined one of the correlation data signals with the peak values of signals from said plurality of maximum detectors to develop a final decision function; and a threshold gate for developing an occurrence decision output whenever the amplitude of the final decision function exceeds that of a decision threshold signal, said occurrence decision output being indicative of the detection of the keyword associated with said decision means.

12. The system of claim 10 wherein said decision means comprises:

a preselected number N of sequentially coupled signal units, each of said signal units comprising:
  a storage circuit for storing a sequence of signals, said storage circuit having a window substantially encompassing its total signal storage capacity;

a maximum detector coupled to said window of said storage circuit for detecting the peak value of the signals stored within said window; and a combiner for developing an output signal by combining the peak value from said maximum detector with a preselected one of the correlation data signals; and a threshold gate, the first one of said sequentially coupled signal units storing a sequence of a first preselected one of the correlation data signals, a sequence of the output signals of each said combiner in the first N-1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence decision output being indicative of the detection of the keyword associated with said decision means.

13. The system of claim 2 wherein each said decision means comprises:

a plurality of storage means for storing respective sequences of predetermined ones of the correlation data signals, each of said storage means having an associated window encompassing a preselected sequence of previously stored correlation data signals associated with that said storage means;

a plurality of maximum detectors respectively coupled to said windows of said plurality of storage means for respectively developing the peak values of signals within said windows;

a combiner for combining another predetermined one of the correlation data signals with the peak values of signals from said plurality of maximum detectors to develop a final decision function; and a threshold gate for developing an occurrence decision output whenever the amplitude of the final decision function exceeds that of a decision threshold signal, said occurrence decision output being indicative of the detection of the keyword associated with said decision means.

14. The system of claim 2 wherein said decision means comprises:

a preselected number N of sequentially coupled signal units, each of said signal units comprising:

a storage circuit for storing a sequence of signals, said storage circuit having a window substantially encompassing its total signal storage capacity;

a maximum detector coupled to said window of said storage circuit for detecting the peak value of the signals stored within said window; and a combiner for developing an output signal by combining the peak value from said maximum detector with a preselected one of the correlation data signals; and a threshold gate, the first one of said sequentially coupled signal units storing a sequence of a first preselected one of the correlation data signals, a sequence of the output signals of each said combiner in the first N-1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence decision output being indicative of the detection of the keyword associated with said decision means.

15. The system of claim 1 wherein said generator means comprises:

means responsive to the plurality of spectral parameters for developing time division multiplexed spectral estimates therefrom; and conversion means for developing the digitized spectral parameters in response to the time division multiplexed spectral estimates.

16. The system of claim 15 wherein each said decision means comprises:

a plurality of storage means for storing respective sequences of predetermined ones of the correlation data signals, each of said storage means having an associated window encompassing a preselected sequence of previously stored correlation data signals associated with that said storage means;

a plurality of maximum detectors respectively coupled to said windows of said plurality of storage means for respectively developing the peak values of signals within said windows;

a combiner for combining another predetermined one of the correlation data signals with the peak values of signals from said plurality of maximum detectors to develop a final decision function; and a threshold gate for developing an occurrence decision output whenever the amplitude of the final decision function exceeds that of a decision threshold signal, said occurrence decision output being indicative of the detection of the keyword associated with said decision means.

17. The system of claim 15 wherein said decision means comprises:

a preselected number N of sequentially coupled signal units, each of said signal units comprising:

a storage circuit for storing a sequence of signals, said storage circuit having a window substantially encompassing its total signal storage capacity;

a maximum detector coupled to said window of said storage circuit for detecting the peak value of the signals stored within said window; and a combiner for developing an output signal by combining the peak value from said maximum detector with a preselected one of the correlation data signals; and a treshold gate, the first one of said sequentially coupled signal units storing a sequence of a first preselected one of the correlation data signals, a sequence of the output signals of each said combiner in the first N-1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence decision output being indicative of the detection of the keyword associated with said decision means.

18. The system of claim 15 wherein said correlation means comprises:
second memory means for storing the digitized spectral parameters during a first mode of operation and for sequentially reading out sequences of digitized spectral parameters during a second mode of operation; and
means for sequentially and asynchronously correlating each of the prestored dyad and triad subelement signals during the second mode of operation with a correspondingly long sequence of digitized spectral parameters to asynchronously develop a corresponding correlation data signal for each prestored subelement signal, the amplitude of each correlation data signal being indicative of the closeness of match between its associated prestored subelement signal and the corresponding sequence of digitized spectral parameters.

19. The system of claim 18 wherein each said decision means comprises:
a plurality of storage means for storing respective sequences of predetermined ones of the correlation data signals, each of said storage means having an associated window encompassing a preselected sequence of previously stored correlation data signals associated with that said storage means;
a plurality of maximum detectors respectively coupled to said windows of said plurality of storage means for respectively developing the peak values of signals within said windows;
a combiner for combining another predetermined one of the correlation data signals with the peak values of signals from said plurality of maximum detectors to develop a final decision function; and
a threshold gate for developing an occurrence decision output whenever the amplitude of the final decision function exceeds that of a decision threshold signal, said occurrence decision output being indicative of the detection of the keyword associated with said decision means.

20. The system of claim 18 wherein said decision means comprises:
a preselected number N of sequentially coupled signal units, each of said signal units comprising:
a storage circuit for storing a sequence of signals, said storage circuit having a window substantially encompassing its total signal storage capacity;
a maximum detector coupled to said window of said storage circuit for detecting the peak value of the signals stored within said window; and
a combiner for developing an output signal by combining the peak value from said maximum detector with a preselected one of the correlation data signals; and
a threshold gate, the first one of said sequentially coupled signal units storing a sequence of a first preselected one of the correlation data signals, a sequence of the output signals of each said combiner in the first N−1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence decision output being indicative of the detection of the keyword associated with said decision means.

21. The system of claim 1 wherein said correlation means comprises:
second memory means for storing the digitized spectral parameters during a first mode of operation and for sequentially reading out sequences of digitized spectral parameters during a second mode of operation; and
means for sequentially and asynchronously correlating each of the prestored dyad and triad subelement signals during the second mode of operation with a correspondingly long sequence of digitized spectral parameters to asynchronously develop a corresponding correlation data signal for each prestored subelement signal, the amplitude of each correlation data signal being indicative of the closeness of match between its associated prestored subelement signal and the corresponding sequence of digitized spectral parameters.

22. The system of claim 21 wherein each said decision means comprises:
a plurality of storage means for storing respective sequences of predetermined ones of the correlation data signals, each of said storage means having an associated window encompassing a preselected sequence of previously stored correlation data signals associated with that said storage means;
a plurality of maximum detectors respectively coupled to said windows of said plurality of storage means for respectively developing the peak values of signals within said windows;
a combiner for combining another predetermined one of the correlation data signals with the peak value of signals from said plurality of maximum detectors to develop a final decision function; and
a threshold gate for developing an occurrence decision output whenever the amplitude of the final decision function exceeds that of a decision threshold signal, said occurrence decision output being indicative of the detection of the keyword associated with said decision means.

23. The system of claim 21 wherein said decision means comprises:
a preselected number N of sequentially coupled signal units, each of said signal units comprising:
a storage circuit for storing a sequence of signals, said storage circuit having a window substantially encompassing its total signal storage capacity;
a maximum detector coupled to said window of said storage circuit for detecting the peak value of the signals stored within said window; and
a combiner for developing an output signal by combining the peak value from said maximum detector with a preselected one of the correlation data signals; and
a threshold gate, the first one of said sequentially coupled signal units storing a sequence of a first preselected one of the correlation data signals, a sequence of the output signals of each said combiner in the first N-1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence decision output being indicative of the detection of the keyword associated with said decision means.

24. The system of claim 1 wherein each of said decision means comprises:
- a plurality of storage means for storing respective sequences of predetermined ones of the correlation data signals, each of said storage means having an associated window encompassing a preselected sequence of previously stored correlation data signals associated with that said storage means;
- a plurality of maximum detectors respectively coupled to said windows of said plurality of storage means for respectively developing the peak values of signals within said windows;
- a combiner for combining another predetermined one of the correlation data signals with the peak values of signals from said plurality of maximum detectors to develop a final decision function; and
- a threshold gate for developing an occurrence decision output whenever the amplitude of the final decision function exceeds that of a decision threshold signal, said occurrence decision output being indicative of the detection of the keyword associated with said decision means.

25. The system of claim 1 wherein said decision means comprises:
- a preselected number N of sequentially coupled signal units, each of said signal units comprising:
  - a storage circuit for storing a sequence of signals, said storage circuit having a window substantially encompassing its total signal storage capacity;
  - a maximum detector coupled to said window of said storage circuit for detecting the peak value of the signals stored within said window; and
  - a combiner for developing an output signal by combining the peak value from said maximum detector with a preselected one of the correlation data signals; and
- a threshold gate, the first one of said sequentially coupled signal units storing a sequence of a first preselected one of the correlation data signals, a sequence of the output signals of each said combiner in the first N-1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence output being indicative of the detection of the keyword associated with said decision means.

26. A system for asynchronously detecting one or more keywords in continuous speech, said system comprising:
- input means for separating an input continuous speech signal into a plurality of frequency components;
- parameter means for developing a plurality of spectral estimates in response to the plurality of frequency components;
- generator means for periodically generating digitized spectral parameters in response to the plurality of spectral estimates;
- first memory means for storing sequences of the periodically generated digitized spectral parameters;
- second memory means for prestoring preselected ones of dyad and triad subelements associated with at least one preselected keyword;
- means for asynchronously correlating each of the prestored dyad and triad subelements with a correspondingly long sequence of digitized spectral parameters during a read mode of operation to asynchronously develop a corresponding correlation data signal for each prestored subelement; and
- a decision means for each desired keyword, each of said decision means being responsive to associated ones of the correlation data signals for developing an occurrence decision output whenever an associated keyword is detected.

27. The system of claim 26 wherein each said decision means comprises:
- a plurality of storage means for storing respective sequences of predetermined ones of the correlation data signals, each of said storage means having an associated window encompassing a preselected sequence of previously stored correlation data signals associated with that said storage means;
- a plurality of maximum detectors respectively coupled to said windows of said plurality of storage means for respectively developing the peak values of signals within said windows;
- a combiner for combining another predetermined one of the correlation data signals with the peak values of signals from said plurality of maximum detectors to develop a final decision function; and
- a threshold gate for developing an occurrence decision output whenever the amplitude of the final decision function exceeds that of a decision threshold signal, said occurrence decision output being indicative of the detection of the keyword associated with said decision means.

28. The system of claim 26 wherein said decision means comprises:
- a preselected number N of sequentially coupled signal units, each of said signal units comprising:
  - a storage circuit for storing a sequence of signals, said storage circuit having a window substantially encompassing its total signal storage capacity;
  - a maximum detector coupled to said window of said storage circuit for detecting the peak value of the signals stored within said window; and
  - a combiner for developing an output signal by combining the peak value from said maximum detector with a preselected one of the correlation data signals; and
- a threshold gate, the first one of said sequentially coupled signal units storing a sequence of a first preselected one of the correlation data signals, a sequence of the output signals of each said combiner in the first N-1 combiners being applied to and stored in said storage circuit in the following one of said signal units, a sequence of the output signals of the Nth one of said combiners being applied to said threshold gate, said threshold gate generating an occurrence decision output whenever the amplitude of an output signal from the Nth one of said combiners exceeds that of a decision threshold signal, said occurrence decision output being indicative of the detection of the keyword associated with said decision means.

29. A system for asynchronously detecting one or more keywords in continuous speech, said system comprising:
- first means responsive to a continuous speech signal for periodically generating a plurality of digitized spectral parameters therefrom;
- means for prestoring predetermined ones of dyad and triad subelement signals associated with one or more preselected element signals associated with one or more preselected keywords;
- correlation means for asynchrously correlating each of the prestored dyad and triad subelement signals of one or more preselected keywords with continuous sequences of the digitized spectral parameters to asynchronously produce a plurality of continuous correlation data signals; and
- a decision means for each desired keyword, each of said decision means being responsive to associated ones of the correlation data signals for developing an occurrence decision output whenever an associated keyword has been detected.

30. A system for asynchronously detecting keywords in continuous speech, said system comprising:
- means for generating a continuous sequence of digitized spectral parameters from the continuous speech;
- means for prestoring predetermined ones of dyad and triad subelement signals associated with one or more preselected keywords;
- means for asynchronously correlating each of the prestored dyad and triad subelements of the preselected keywords with the continuous sequence of digitized spectral parameters to asynchronously produce a continuous sequence of respective correlation data signals; and
- means for developing an output signal indicative of the detection of a keyword whenever an associated sequence of correlation data signals develops a function signal having an amplitude greater than a predetermined threshold level.

31. The system of claim 30 wherein said generating means comprises:
- means for producing a plurality of continuous spectral estimates from the continuous speech; and
- means for converting the continuous spectral estimates into the continuous sequence of digitized spectral parameters.

32. A machine method for asynchronously detecting at least one preselected keyword in an input continuous speech signal comprising the steps of:
- generating periodically a plurality of digitized spectral parameters from the input continuous speech signal;
- correlating asynchronously each of a plurality of preselected ones of dyad and triad subelement signals associated with said at least one preselected keyword with continuous sequences of pluralities of digitized spectral parameters to asynchronously produce a plurality of continuous correlation data signals; and
- developing an occurrence decision output signal for each associated keyword that is detected in an associated sequence of correlation data signals.

33. A machine method for asynchronously detecting at least one preselected keyword in an input continuous speech signal comprising the steps of:
- producing a plurality of spectral estimates continuously from the input continuous speech signal;
- generating digitized spectral parameters periodically from the plurality of spectral estimates;
- correlating asynchronously each of a plurality of preselected ones of dyad and triad subelements associated with said at least one preselected keyword with continuous sequences of the digitized spectral parameters to asynchronously produce a plurality of continuous correlation data signals; and
- developing an occurrence decision output signal for each associated keyword that is detected in an associated sequence of correlation data signals.

34. A machine method for asynchronously detecting preselected keywords in continuous speech comprising the steps of:
- producing a continuous sequence of digitized spectral parameters from the continuous speech;
- correlating asynchronously each of a plurality of preselected ones of dyad and triad subelements associated with the preselected keywords with the digitized spectral parameters to asynchronously develop respective correlation data signals; and
- developing an output signal indicative of the detection of a keyword whenever an associated sequence of correlation data signals develops a function signal having an amplitude greater than a predetermined threshold level.

35. The machine method of claim 34 wherein said producing step comprises the steps of:
- generating a plurality of continuous analog spectral estimates from the continuous speech; and
- converting the continuous analog spectral estimates into a continuous sequence of digitized spectral parameters.

* * * * *

UNITED STATES PATENT AND TRADEMARK OFFICE
CERTIFICATE OF CORRECTION

PATENT NO. : 4,081,607
DATED : Mar. 28, 1978
INVENTOR(S) : Visvaldis A. Vitols and James E. Paul, Jr.

It is certified that error appears in the above-identified patent and that said Letters Patent are hereby corrected as shown below:

Column 2, line 59, delete "manner" and substitute -- preferred --;

Column 3, line 50, delete "erator 13 to N digitized spectral parameters, or develop" and substitute -- erator 13 to develop N digitized spectral parameters, or --;

Column 8, line 24, delete "threshold" and substitute -- of --;

Column 11, line 21, delete "140-255" and substitute -- 240-255 --;

Column 23, line 28, delete "thw" and substitute -- the --;

line 65, delete "association" and substitute -- associated --

Signed and Sealed this

Tenth Day of October 1978

[SEAL]

Attest:

RUTH C. MASON
*Attesting Officer*

DONALD W. BANNER
*Commissioner of Patents and Trademarks*